United States Patent
Albrecht et al.

[11] Patent Number: 5,930,065
[45] Date of Patent: Jul. 27, 1999

[54] TIMING BASED SERVO LONGITUDINAL ADDRESSING

[75] Inventors: Thomas Robert Albrecht; Robert Carl Barrett, both of San Jose; James Howard Eaton, Morgan Hill, all of Calif.; Robert Allen Hutchins; Glen Alan Jaquette, both of Tucson, Ariz.

[73] Assignee: International Business Machines Corporation, Armonk, N.Y.

[21] Appl. No.: 08/859,830

[22] Filed: May 16, 1997

[51] Int. Cl.$^6$ ................................................. G11B 27/19
[52] U.S. Cl. ............................ 360/72.2; 360/40; 360/49; 360/75; 360/77.12
[58] Field of Search .................. 360/77.12, 78.02, 360/48, 49, 77.07, 77.11, 72.1, 72.2, 51, 75, 44, 39, 40, 69

[56] References Cited

U.S. PATENT DOCUMENTS

| | | | |
|---|---|---|---|
| 4,549,232 | 10/1985 | Axmear et al. | 360/77.07 |
| 5,003,412 | 3/1991 | Bizjak et al. | 360/77.01 |
| 5,608,587 | 3/1997 | Smith | 360/77.08 |
| 5,689,384 | 11/1997 | Albrecht et al. | 360/77.12 |
| 5,771,126 | 6/1998 | Choi | 360/49 |

*Primary Examiner*—W. R. Young
*Assistant Examiner*—James L Habermehl
*Attorney, Agent, or Firm*—John H. Holcombe; Robert M. Sullivan

[57] ABSTRACT

Disclosed is a magnetic tape media having addressing data information superimposed on prerecorded track following servo information. The servo information is recorded in magnetic flux transition patterns defining at least one longitudinal servo track. A servo burst pattern of at least two repeated pairs of non-parallel magnetic flux transitions is provided, at least one of which transitions is slanted or otherwise continuously longitudinally variable across the width of the servo track. At least two transitions of the repeated pairs are shifted longitudinally with respect to other of the transitions, the shifted transitions comprising the superimposed addressing data information. Also disclosed is a magnetic tape media having prerecorded combined servo and data information recorded in repeated pairs of magnetic flux dual transitions, at least one of the repeated pairs of dual transitions having a different width with respect to other of the transitions, the different width transitions comprising data information.

85 Claims, 17 Drawing Sheets

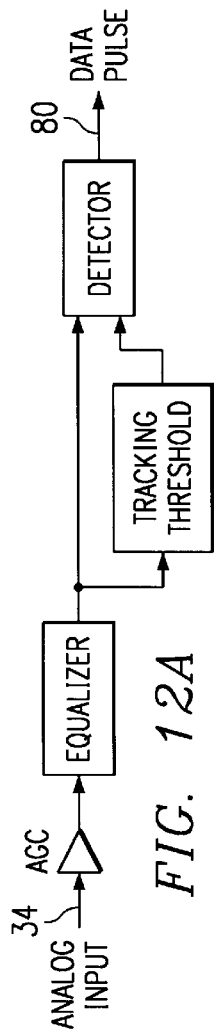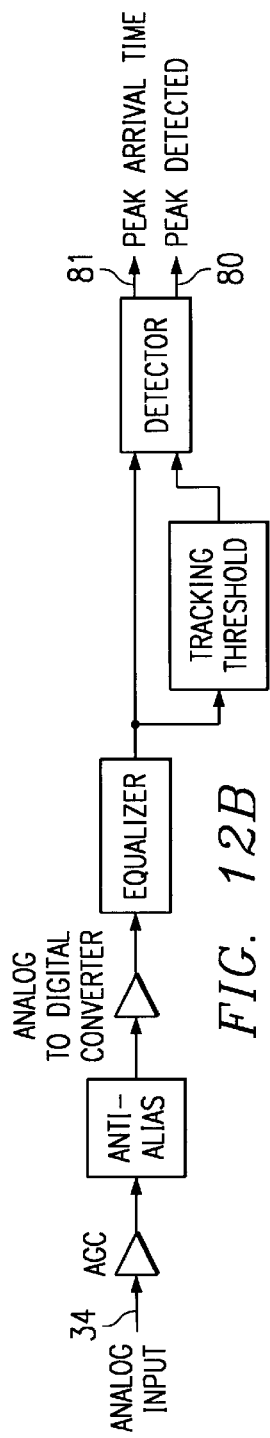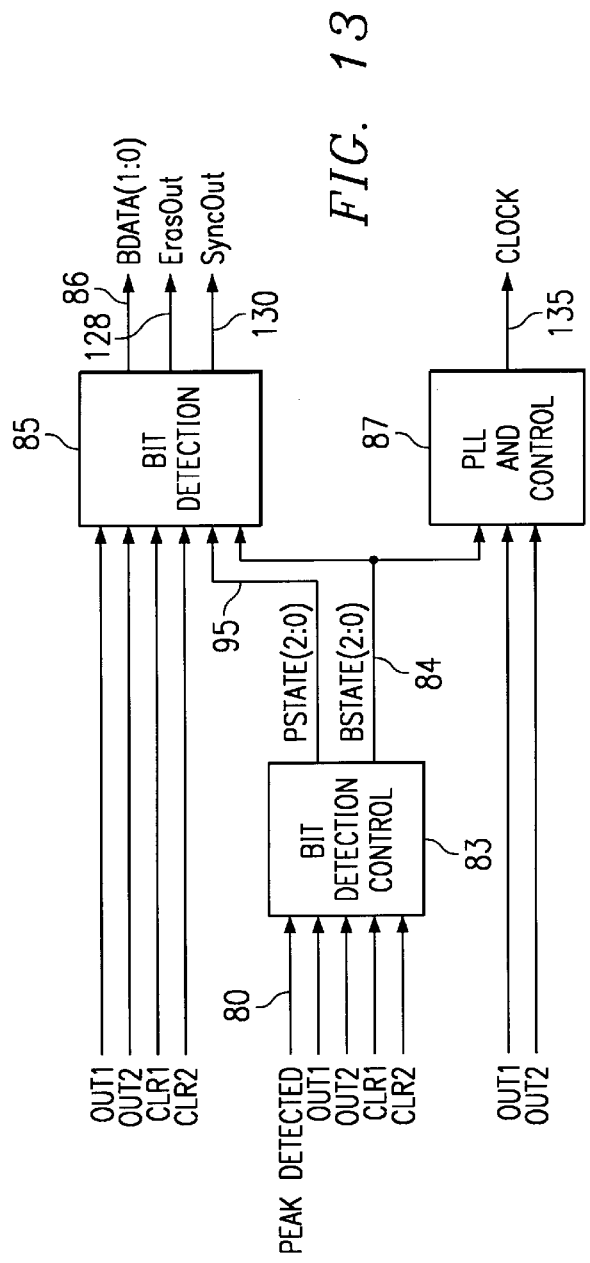
FIG. 12A
FIG. 12B
FIG. 13

TIMING BASED SERVO LONGITUDINAL ADDRESSING

DOCUMENTS INCORPORATED BY REFERENCE

Commonly assigned U.S. Pat. Ser. No. 5,689,384, filed Jun. 30, 1994, Albrecht et al., is incorporated for its showing of a timing based servo system for magnetic tape systems.

TECHNICAL FIELD

This invention relates to timing based servos for longitudinal recording, and, more particularly, to superimposing data or addressing information onto the timing based servo information, and to drives for reading the superimposed data or addressing information.

BACKGROUND OF THE INVENTION

One method magnetic tape devices utilize to maximize capacity is to maximize the number of parallel tracks on the tape. The typical way of maximizing the number of tracks is to employ servo systems which provide track following and allow the tracks to be spaced very closely. Even so called "low end" tape devices are now employing track following to maximize the number of tracks.

An example of track following servoing is the provision of groups of prerecorded parallel longitudinal servo tracks that lie between groups of longitudinal data tracks, so that one or more servo heads may read the servo information and an accompanying track following servo will adjust the lateral position of the head or of the tape to maintain the servo heads centered over the corresponding servo tracks. The servo heads are spaced a defined distance from the data heads, so that centering the servo heads results in the data heads being centered over the data tracks. The defined distance is maintained for all tape drives in a particular family allowing exchange of tape media between tape drives in the same or compatible families.

An example of a track following servo system particularly adapted to tape comprises that of the Albrecht, et al. 08-270207 application. The servo patterns are comprised of magnetic flux transitions recorded in continuous lengths at non-parallel angles, such that the timing of the servo transitions read from the servo pattern at any point on the pattern varies continuously as the head is moved across the width of the servo pattern. For example, the pattern may comprise straight transitions essentially perpendicular to the length of the track alternating with sloped or slanted transitions, each comprising a pair of transitions. Thus, the relative timing of transitions read by a servo read head varies linearly depending on the lateral position of the head. Speed invariance is provided by utilizing a group of interlaced pairs of transitions and determining the ratio of two timing intervals, the interval between two like transitions compared to the interval between two dissimilar transitions. Synchronization of the decoder to the servo pattern may be accomplished by having two separate groups of pairs of transitions, each group having a different number of pairs of transitions. Thus, the position in the set of groups is readily determined by knowing the number of pairs of transitions in the present group.

Although the determination of the lateral position of a head with respect to the width of a tape may be readily accomplished by such servo systems, there is no good means of determining of the longitudinal position of a tape. Rough estimates of longitudinal position of a tape may be made by counting the number of rotations of an idle guide wheel or of a motor or reel, for example by having an index mark on the wheel, etc. More accurate longitudinal position information relative to data records may be based on detection of the data records themselves. There are a number of problems with these approaches. One is a tape cartridge which was ejected without being rewound so that the count of index marks may be meaningless. Another is locating a record based on an index table of its position by reading records continuously until the correct record number is found. This is a major problem if one of the records is damaged, or if write skipping is allowed. With write skipping, multiple copies of a record are allowed, or subsets of a record are allowed, if the first copy is bad. Any error recovery procedure is now complicated by uncertainty as to which copy of the record is being read.

Another example is to use a fineline tachometer used to give a large number of positions per revolution of a motor or reel, perhaps in the hundreds. However, the fineline tachometer adds to the cost of the drive, making it unusable for low end tape drives. It also occupies considerable space, increasing the reel motor spindle height and making a low height form factor more difficult to achieve and preventing the use of low cost off-the-shelf motors.

SUMMARY OF THE INVENTION

Disclosed is a magnetic tape media having data information superimposed on prerecorded track following servo information, which data information may comprise longitudinal addressing or tachometer information. The servo information is recorded in magnetic flux transition patterns defining at least one longitudinal servo track. A servo burst pattern of at least two repeated pairs of non-parallel magnetic flux transitions is provided, at least one of which transitions of each pair is slanted or otherwise continuously longitudinally variable across the width of the servo track. At least two transitions of the repeated pairs are shifted longitudinally with respect to other of the transitions of the repeated pairs, the shifted transitions comprising the superimposed addressing data information. Again, the non-parallel servo transition pair comprises at least one transition which is slanted, etc., with respect to the paired transition.

Another aspect of the invention is a sensible transition pattern for recording combined servo and data information on a recording medium with at least two transitions of repeated pairs of non-parallel servo transitions shifted longitudinally with respect to other transitions of the repeated pairs, the shifted transitions comprising data information.

Still another aspect of the invention is a data system for reading the data superimposed in the servo pattern on a moving storage medium, having a servo transducer sensing the servo transitions in the longitudinal direction with respect to the moving storage medium, a detector responsive to the sensed servo transitions that detects position shifts of the non-parallel servo transitions, and a decoder responsive to the detected position shifts that decodes the superimposed data. The data system may also be provided as part of a magnetic tape drive in another aspect of the invention.

Another aspect of the present invention is a magnetic tape servo writer for writing prerecorded servo information comprising pairs of non-parallel magnetic flux transitions with superimposed data having an encoder for encoding data into predetermined time shifts, and a pulse timer responsive to the encoder for shifting the timing of a source of timed pulses to thereby shift at least two non-parallel magnetic flux transitions of pairs of transitions longitudinally with respect to other transitions of the pairs, the shifted transitions comprising data information.

Further aspects of the present invention are a method for superimposing data information in and a method for decoding superimposed data information from non-parallel servo transitions.

Another aspect of the present invention is the superimposition of different types of data on separate parallel servo tracks, one of the types of data comprising address information.

Lastly, other aspects of the present invention relate to a magnetic tape media having prerecorded combined servo and data information recorded in repeated pairs of magnetic flux dual transitions, the servo information comprising only one of the dual transitions, at least one of the dual transitions having a different width with respect to other transitions of the repeated pairs, the different width transitions comprising data information.

For a fuller understanding of the present invention, reference should be made to the following detailed description taken in conjunction with the accompanying drawings.

BRIEF DESCRIPTION OF THE DRAWINGS

FIGS. 12A and 12B are block diagrams of alternative embodiments of peak detection channels of FIG. 11;

FIG. 13 is a block diagram of a bit detector employed in the bit detection and synchronization block of FIG. 11;

DETAILED DESCRIPTION OF THE INVENTION

Figure 1:
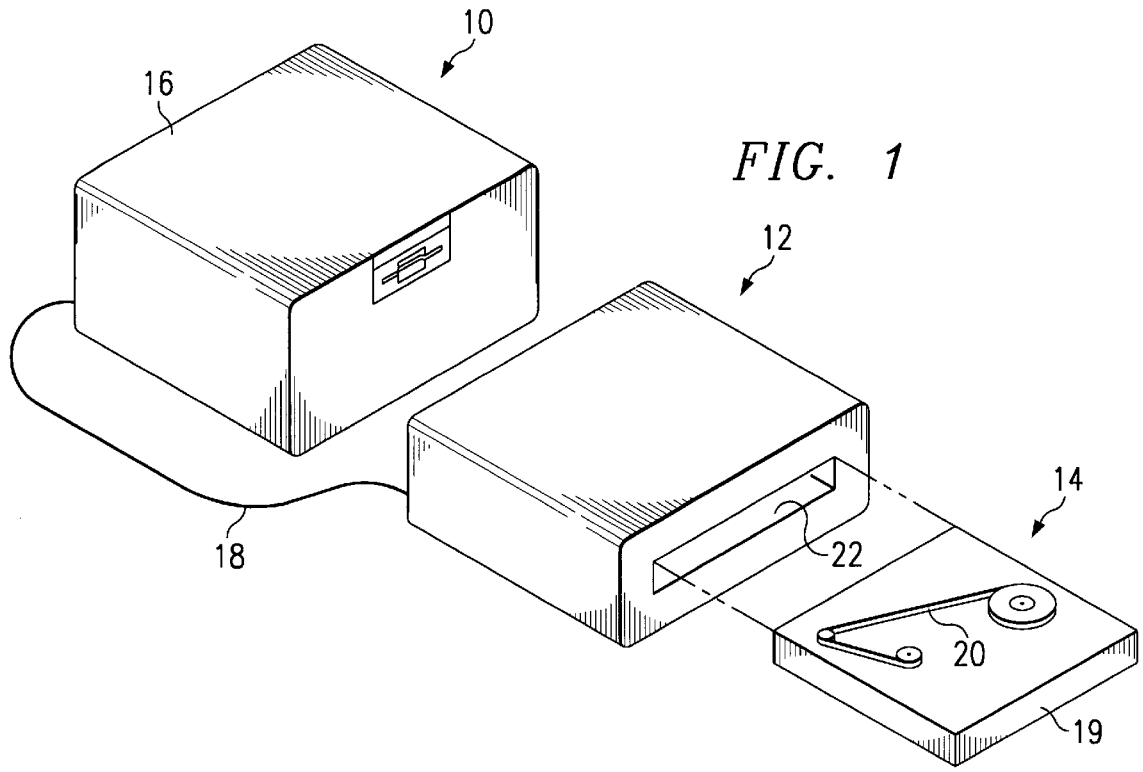
FIG. 1 is a perspective view representation of a tape drive data storage device and associated tape cartridge in accordance with an embodiment of the present invention.
Figure 2:
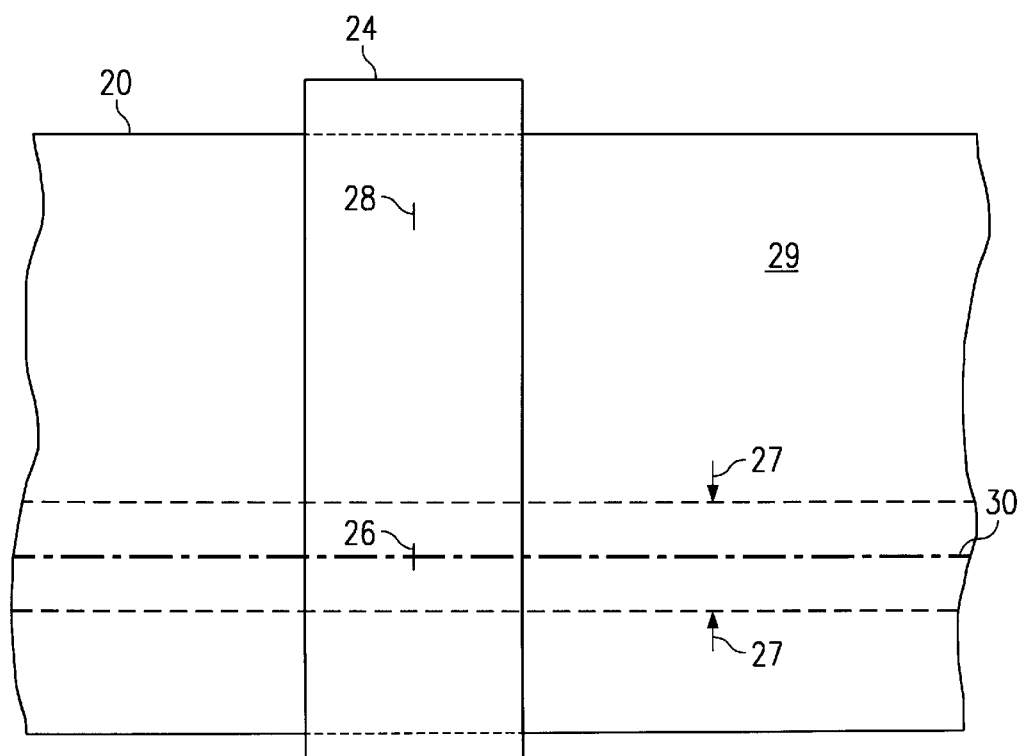
FIG. 2 is a schematic and block diagram of a magnetic head and servo system of the tape drive and cartridge illustrated in FIG. 1.

Referring to FIGS. 1 and 2, a timing based servo system 10 is illustrated that reads a servo pattern and reads data superimposed in the servo pattern in accordance with an embodiment of the present invention. Referring to FIG. 1, the system includes a tape drive 12 that accepts a tape data cartridge 14 and is connected to a host processor 16 by a cable 18. The tape cartridge 14 comprises a housing 19 containing a length of magnetic tape 20. The tape drive 12 includes a receiving slot 22 into which the cartridge 14 is inserted. The host processor 16 can comprise any suitable processor, for example, a personal computer such as the IBM "Aptiva", or can be a workstation such as the IBM "RS6000", or can be a systems computer, such as the IBM "AS400". The tape drive 12 is preferably compatible with the associated host processors and can assume any one of a variety of cartridge or cassette linear formats. Examples of such tape drives include the IBM "3490" tape drive units, or "Digital Linear Tape" or "Travan" compatible tape drives.

Referring to FIG. 2, such tape drives typically include drive motors (not shown) for rotating the reels of the cartridge 14 to move the tape 20 across a head assembly 24. The head assembly is shown in solid lines and includes a relatively narrow servo read head 26 that detects a servo pattern recorded in a servo track 27 of the tape. A data head 28 of the head assembly is typically larger than the servo head and is positioned over a data track region 29 of the tape containing multiple data tracks for reading data recorded in a data track, or for writing data in a data track. FIG. 2 shows a single servo read head and a single data head for simplicity of illustration. Those skilled in the art will appreciate that most tape systems have multiple parallel servo tracks, multiple servo read heads, and multiple data read and write heads.

The servo track centerline 30 is indicated as extending along the length of the tape 20. The servo read head 26 is relatively narrow and has a width substantially less than the width of the servo track 27. In accordance with the incorporated Albrecht et al. application, the tape is moved longitudinally across the tape head assembly 24 so that the servo track 27 is moved linearly with respect to the servo head 26. When such movement occurs, the servo pattern of magnetic flux transitions is detected by the servo read head 26 so that it generates an analog servo read head signal that is provided via a servo signal line 34 to a signal decoder 36. The signal decoder processes the servo read head signal and generates a position signal that is transmitted via position signal lines 38 to a servo controller 40. The servo controller generates a servo control signal and provides it on control lines 42 to a servo positioning mechanism at head assembly 24. The servo positioning mechanism responds to the control signal from the servo controller by moving the assembly including servo head 26 laterally with respect to the servo track centerline 30 to reach the desired servo track or to maintain the servo head 26 centered with respect to the servo track centerline 30.

Figure 3:
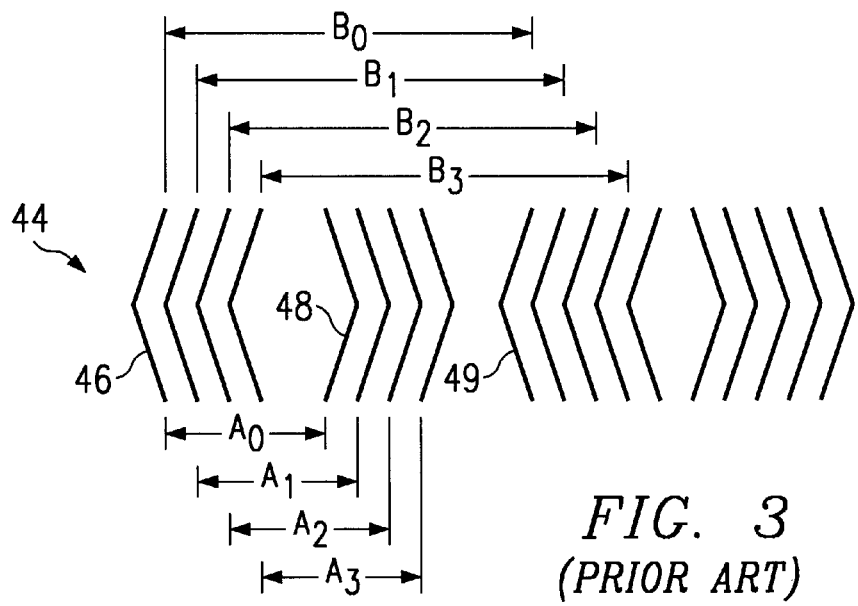
FIG. 3 is a representation of an exemplary servo pattern of the prior art.

FIG. 3 illustrates an exemplary servo pattern in accordance with the Albrecht et al. application. Those skilled in the art will recognize that the vertical lines represent stripes of magnetic flux transitions or areas of magnetic flux that extend across the width of a servo track. In the case of areas of magnetic flux, the edges comprise flux transitions that are detected to generate the servo read head signal. The transitions have two magnetic polarities, one on each edge of a stripe. When the servo read head 26 crosses a transition, it produces a pulse whose polarity is determined by the polarity of the transition. For example, the servo head might produce positive pulses on the leading edge of each stripe and negative pulses on the trailing edge. The servo pattern 44 comprises repeating transitions having two different orientations. First stripes or "chevrons" 46 extend across the width of a servo track and have a first orientation slanted with respect to the longitudinal direction of the track. Second stripes or chevrons 48 also extend across the width of a servo track, but have a slanted orientation opposite to that of the chevrons 46.

Each chevron 46 and the corresponding chevron 48 comprise a pair of transitions separated by a predetermined distance $A_0$, $A_1$, $A_2$ and $A_3$. In the arrangement of the Albrecht et al. application, each of the predetermined distances is identical. The apex of each of the chevrons is located at the servo track centerline. The chevrons 46 and 48 form diamond-shaped patterns that are symmetric about the track centerline.

Thus, as the tape is moved linearly with respect to a servo read head, the servo read head generates an analog servo read head signal having peaks whose peak-to-peak timing varies as the head is moved across the width of the track. This variation in timing is used to determine the relative transverse position of the magnetic servo read head within the servo track. Typically, only the leading edge transitions are employed for the servo timing measurement.

Hereinafter, "non-parallel servo transitions" or similar nomenclature refers to a pair of transitions, at least one of which transitions is slanted, or otherwise continuously longitudinal variable across the width of the servo track, with respect to the paired transition.

The servo patterns illustrated in FIG. 3 include a first set of pairs of transition chevrons 46 and 48, and a second set of pairs of transition chevrons 46 and 49. Transitions 46 and 49 are separated by a predetermined distance $B_0$, $B_1$, $B_2$ and $B_3$. The A and B intervals are used to generate a position signal that is independent of tape speed. It is important that only the A intervals, which are between chevrons at the opposite sides of the diamond-shaped patterns, hereinafter, the "diamonds", vary with transverse position. The B intervals are constant, regardless of position. Thus, the position signal is generated by timing the intervals and calculating their ratio.

The ability to ascertain whether diamonds or like pairs are being read may be determined by having different gaps between the groups of chevrons. Alternatively, the sequence of servo signals can be differentiated by different numbers of chevrons in alternating groups of diamonds. As shown in FIG. 3, 4 chevrons 46 are provided in the first group, and 5 chevrons 49 are provided in the second group.

Figure 4:
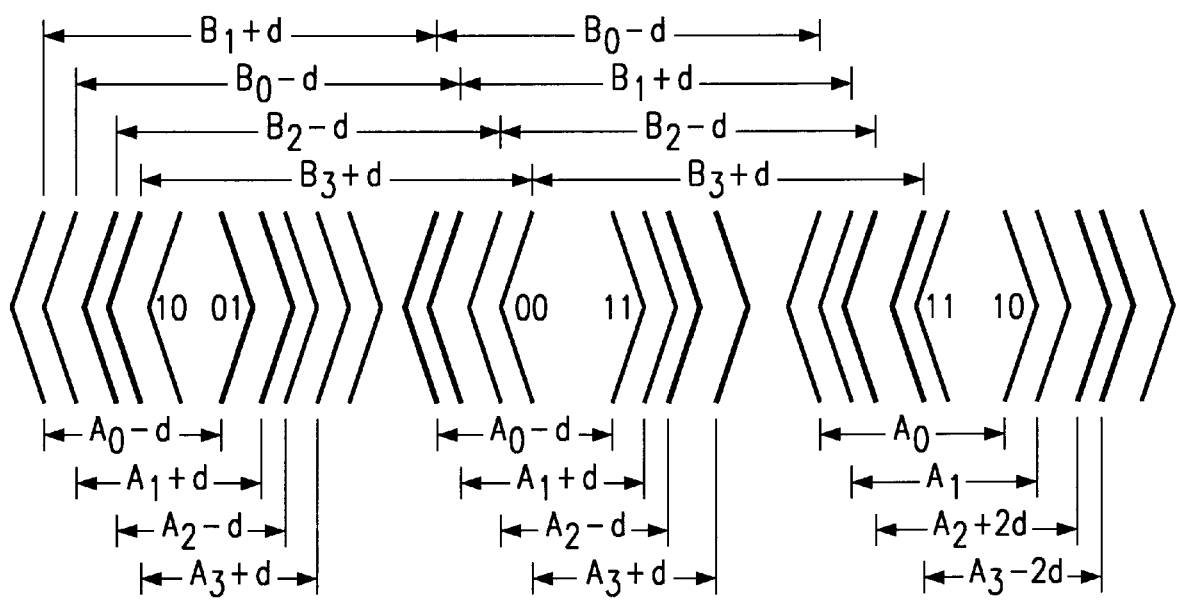
FIG. 4 is a representation of a combined servo and encoded data pattern in accordance with an embodiment of the present invention.

FIG. 4 illustrates the chevrons and diamonds of FIG. 3 where ones of the transitions are shifted longitudinally with respect to the tape to encode data into the servo track. The data may be encoded in any manner so long as the servo timing remains correct.

For the servo loop, the Position Error signal is determined from the equation:

$$\text{error signal} = (A0+A1+A2+A3)/(B0+B1+B2+B3)$$

Where A0 is the distance between the first chevron of the forward group and the first chevron of the reverse group, A1 is the distance between the second chevron of the forward group and the second chevron of the reverse group, etc. Likewise, B0 is the distance between the first chevron of the forward group and the first chevron of the next forward group, A1 is the distance between the second chevron of the forward group and the second chevron of the next reverse group, etc.

If:
X0=the location of first chevron of the forward group
X1=the location of second chevron of the forward group
X2=the location of third chevron of the forward group
X3=the location of fourth chevron of the forward group
Y0=the location of first chevron of the reverse group
Y1=the location of second chevron of the reverse group
Y2=the location of third chevron of the reverse group
Y3=the location of fourth chevron of the reverse group
Z0=the location of first chevron of the next forward group
Z1=the location of second chevron of the next forward group
Z2=the location of third chevron of the next forward group
Z3=the location of fourth chevron of the next forward group
then:
error signal=((Y0−X0)+(Y1−X1)+(Y2−X2)+(Y3−X3))/((Z0−X0)+(Z1−X1)+(Z2−X2)+(Z3−X3))
error signal=((Y0+Y1+Y2+Y3)−(X0+X1+X2+X3))/((Z0+Z1+Z2+Z3)−(X0+X1+X2+X3))
It should be easy to see that the locations of all four members of a group can be offset and produce an identical result, as long as the sum of the offsets equals zero. As an example: If:

$$\text{error signal} = (((Y0+a)+(Y1+b)+(Y2+c)+(Y3+d)) - \\ ((X0+e)+(X1+f)+(X2+g)+(x3+h)))/ \\ (((Z0+i)+(Z1+j)+(Z2+k)+(Z3+1)) - \\ ((X0+e)+(X1+f)+(X2+g)+(X3+h)))$$

gives an identical result to
error signal=((Y0+Y1+Y2+Y3)−(X0+X1+X2+X3))/((Z0+Z1+Z2+Z3)−(X0+X1+X2+X3))
if a+b+c+d=e+f+g+h
 i+j+k+l=e+f+g+h which requires that:

$$a+b+c+d=e+f+g+h=i+j+k+l$$

if the constraint that a diamond is written at a time is added, this means:

$$a=e;\ b=f;\ c=g;\ d=h;$$

forcing this constraint simplifies the equation for the error signal since the effect data modulation has on the numerator is now zero, but it leaves the constraint that:

$$a+b+c+d=i+j+k+l$$

which will always hold true if the data modulation is controlled so that the following is always true:

$$a+b+c+d=0$$
$$i+j+k+l=0$$

The simplicity and separability of this is held to be a preferred embodiment, though not an absolute constraint. The modulation displayed in FIG. 4 through 9 meet this constraint, though one possible embodiment of FIG. 10 avoids it.

One technique which guarantees that $a+b+c+d=0$ is to add the constraint that data modulation will always occur by matching the displacement of one edge with that of another (e.g. modulation will always effect a pair of edges in equal and opposite ways). There are numerous solutions which meet this constraint. For example:

if $a=-b$ and $c=-d$ then $a+b+c+d=0$
and if $i=-j$ and $k=-l$ then $i+j+k+l=0$ and this is indeed one of the preferred embodiments discussed below.

A key is that the chevrons be shifted in pairs in the same or opposite directions or in such a manner that any changes in the pattern offset one another from a servo timing standpoint.

This means that data can be encoded into the location of the chevron patterns without impacting the performance of the servo. The encoded data may be used to encode address information, such as tachometer information, or sector identification number, or to encode other information about the cartridge, such as length of tape, manufacturer, media type, etc.

Figure 5:
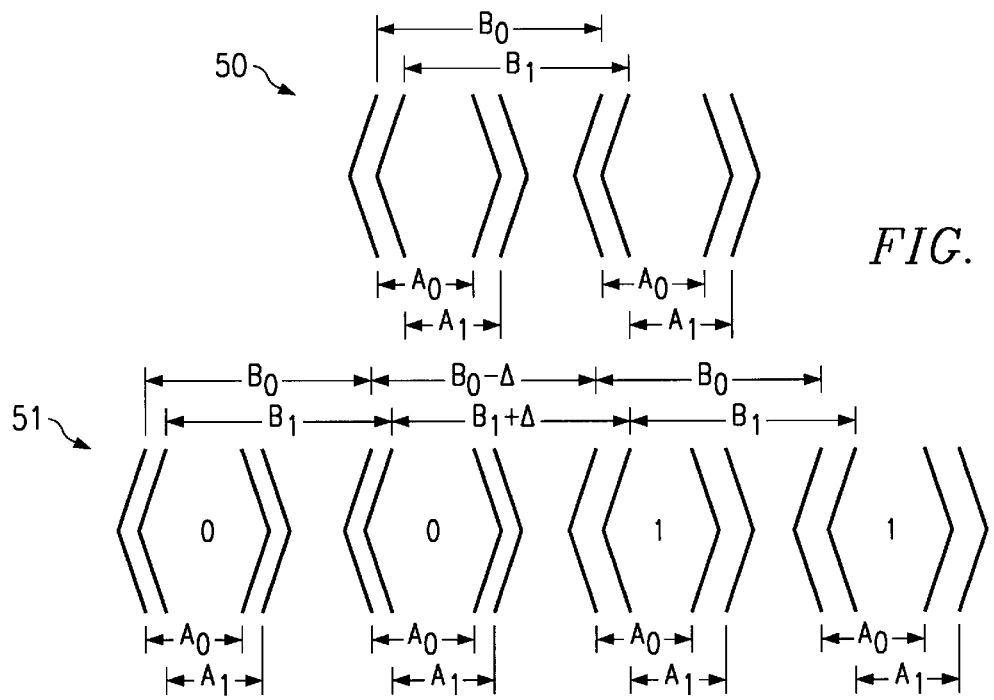
FIG. 5 is a representation of an encoded data pattern in accordance with another embodiment of the present invention.

FIG. 5 illustrates the simplest method for encoding data into the servo pattern. The minimum number of chevrons in a group that can be used to generate a servo position error signal and to encode data is two.

An exemplary encoding algorithm is to encode a "1" by moving the chevrons apart and to encode a "0" by moving the chevrons closer together. The distance each chevron is moved is identical in magnitude but opposite in direction. Since the chevrons must be moved in pairs, both of the chevrons comprising a diamond are moved together as a pair. In FIG. 5, the top diamonds 50 represent the normal spacing of the chevrons without data, and the bottom pattern of diamonds 51 are shown as encoding the bits "0011", reading from left to right.

The major disadvantage with only two chevrons per group is that it is difficult to distinguish a "00000" pattern from a "11111" pattern without the drive speed being constant and known. Velocity independent designs are difficult with only two chevrons per group.

Figure 6:
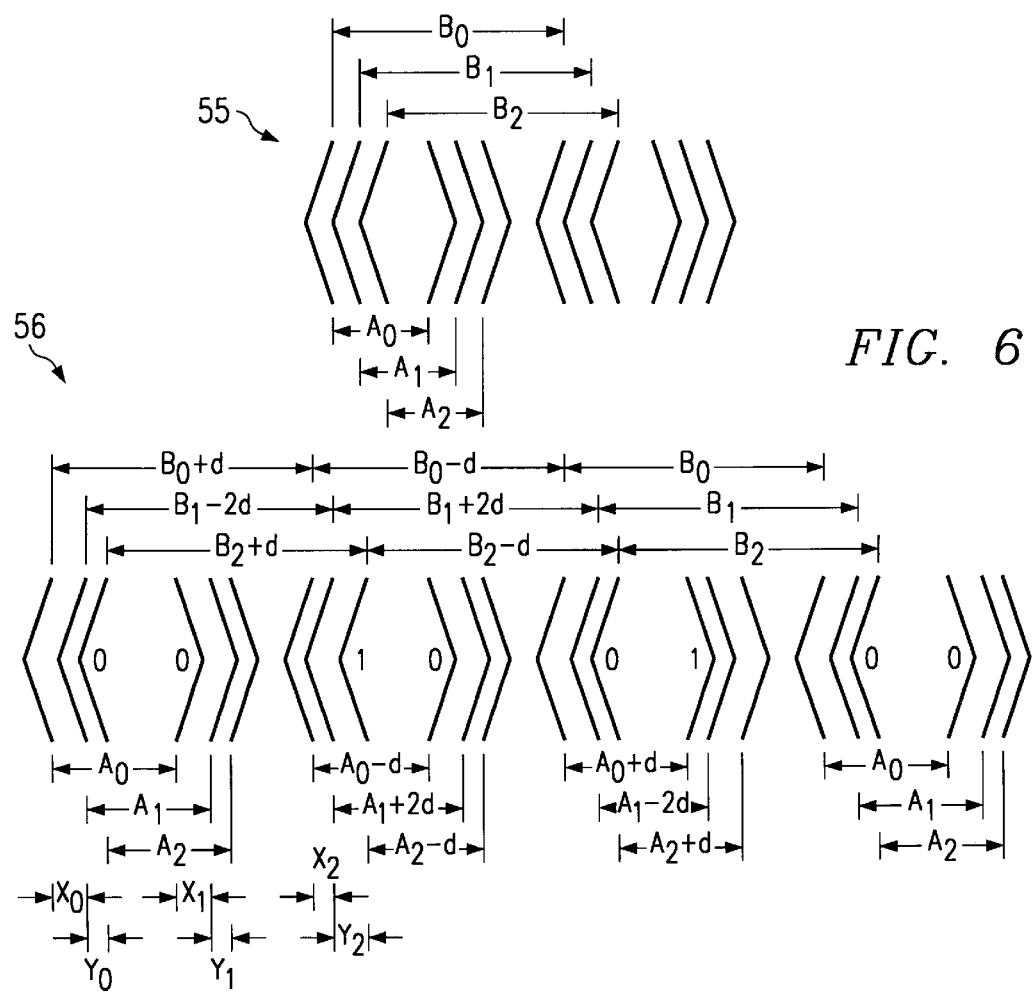
FIG. 6 is a representation of an encoded data pattern in accordance with another embodiment of the present invention.

However, velocity independent designs are possible if three or more chevrons are used per group, as illustrated in FIG. 6. The upper part of FIG. 6 comprises groups 55 of three chevrons each without data and at a normal spacing. The lower part of FIG. 6 illustrates an embodiment of the present invention with groups 56 of three chevrons each where the first two chevrons of each group are shifted to encode data. In the illustrated method, a "0" is encoded by shifting the first two chevrons of the group apart and a "1" is encoded by shifting the first two chevrons of the group together. So long as the shifts are of the same magnitude, they will offset from the standpoint of the servo detector and the resultant servo ratio of A timing intervals to B timing intervals will provide the correct servo transverse positioning signals for track following.

Still referring to FIG. 6, from the standpoint of the encoded data, if X is the distance between the first two chevrons and Y is the distance between the second and third chevron of a group, then a "0" is decoded if X is greater than Y, and a "1" is decoded if Y is greater than X. Thus, $X_0$ and $Y_0$ decode as a "0", $X_1$ and $Y_1$ decode as a "0", $X_2$ and $Y_2$ decode as a "1", etc. The illustrated pattern will work so long as the media on which the pattern is written is moving. It is velocity independent from group to group.

In the illustrated method and pattern, the data encoded on the reverse chevrons of the servo pairs, e.g., diamonds, does not have to mirror the data encoded on the forward group. If the write drivers for the forward group are not connected to the write drivers for the reverse group, the independent data can be written to either group. If the servo write drivers are tied together, then the data in the reverse group will mirror and duplicate the data in the forward group.

Figure 7A:
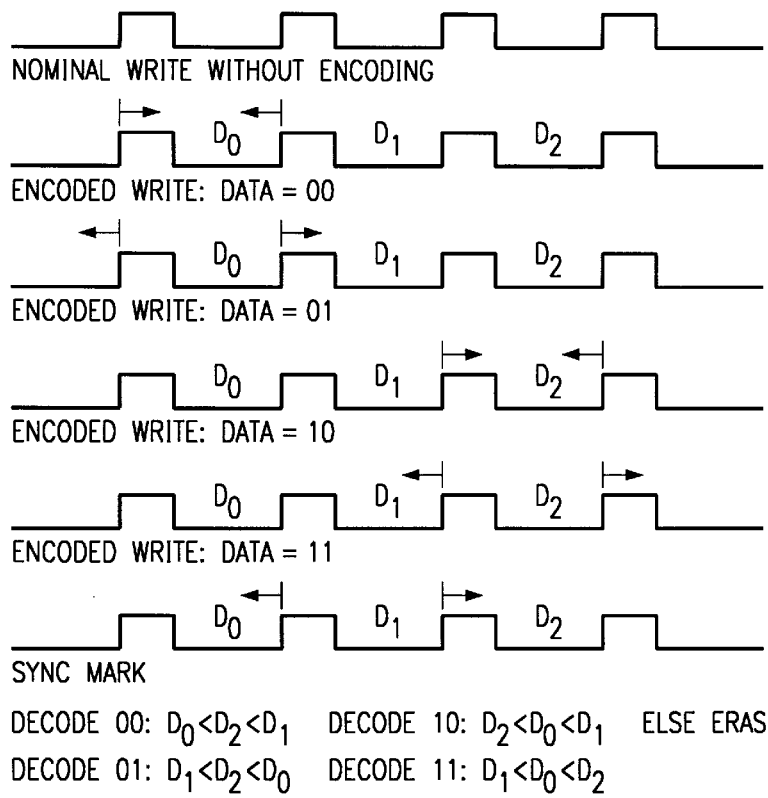
FIGS. 7A and 7B are pulse diagrams of the encoding/decoding of data in accordance with the present invention.

FIG. 7A illustrates pulse patterns of another embodiment of the invention employing four chevrons per group for data. In a preferred embodiment of the invention, these pulse patterns are employed in the alternating four and five diamond bursts illustrated in FIG. 8. The fifth chevron in each five chevron diamond is not encoded for data in this embodiment and provides a synchronization of the sequence of bursts indicating which two of the four of encoded bits in the five and four sequence of pairs of chevrons is being decoded.

Figure 7B:
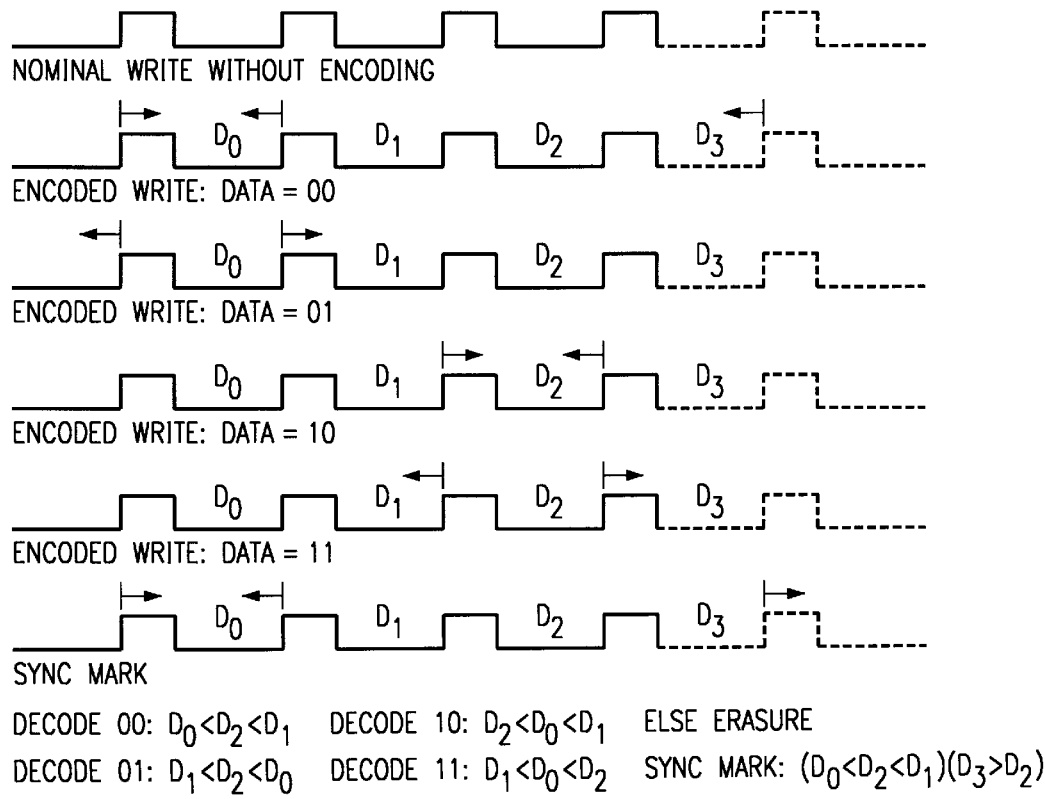
Figure 8:
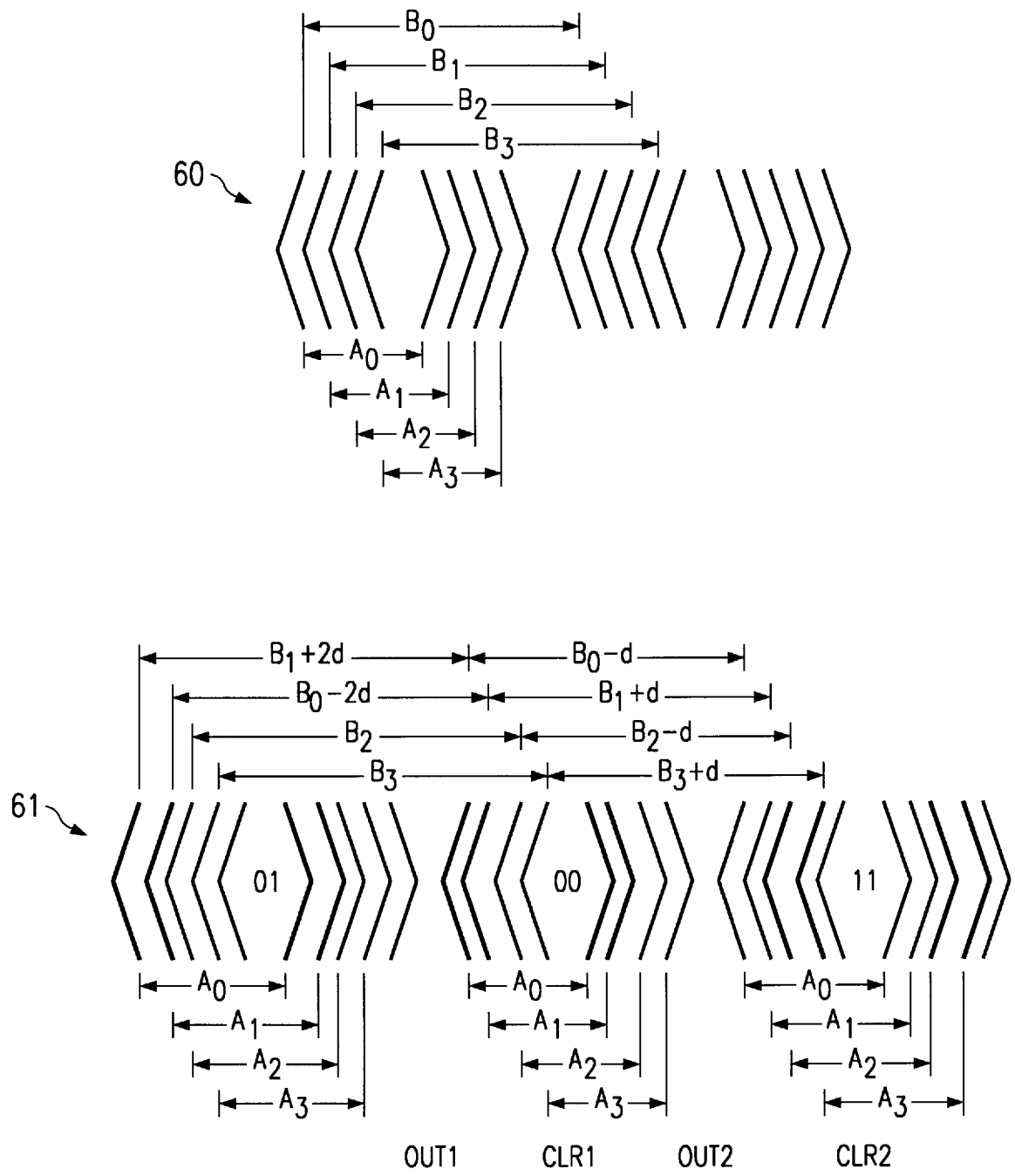
FIG. 8 is a representation of an encoded data pattern in accordance with a preferred embodiment of the present invention.

The pulse patterns of FIGS. 7A and 7B represent the chevrons of FIG. 8. As illustrated in FIG. 8, the chevrons of both the forward group and the reverse group are shifted together. This is accomplished in the servo write process by tying together the write drivers for the forward group and the write drivers for the reverse group. The resultant pattern is analogous to that of FIG. 5, but is extended to groups having a minimum of four diamonds, which provides the ability to encode two bits of data per diamond by shifting either the first two diamonds of each group or the third and fourth diamonds of each group. The upper set of diamonds 60 has no data and the chevrons are at nominal distances. The lower set of diamonds 61 has the illustrated data pattern encoded by shifting the darkened chevrons.

FIG. 7B illustrates the shifting of pulses obtained from reading the servo data and illustrates the decoding of the pulses. FIG. 7B also illustrates the shifting of the fifth chevron in a five chevron group to provide a synch mark for identifying a word of data. For example, a word of data may comprise a 32 bit sequence, and the synch mark will indicate the end of one word and the beginning of the next.

In order to maintain the appropriate servo intervals over a group of diamonds, each of the chevron encoding designs shifts two chevrons at a time in this embodiment. Thus, there is always an offset of the A and of the B intervals by + and − d offset pairs (equal and opposite offsets which cancel one another) in each diamond burst so that the position servo information will be unaffected by the data modulation.

Figure 9:
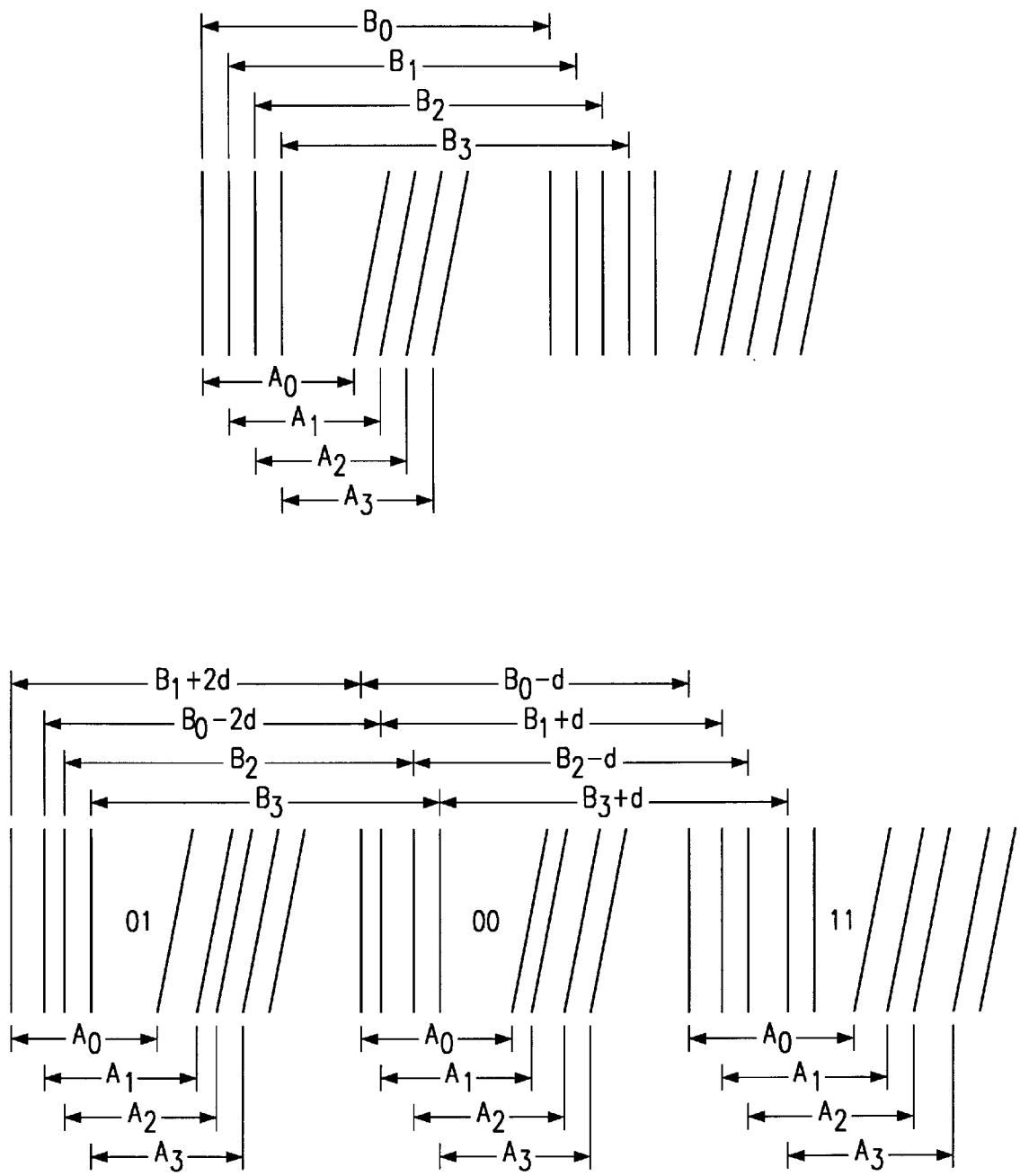
FIG. 9 is a representation of the encoded data pattern of FIG. 8 in an alternative servo pattern.

FIG. 9 illustrates the arrangement of FIG. 8, but employing one transition which is perpendicular to the longitudinal direction of the servo track and another which is slanted for each pair of transitions comprising the "diamond". This and many other alternative types of transitions forming the equivalent of "chevrons" and "diamonds" may be envisioned by those of skill in the art as not departing from the present invention.

Figure 10:
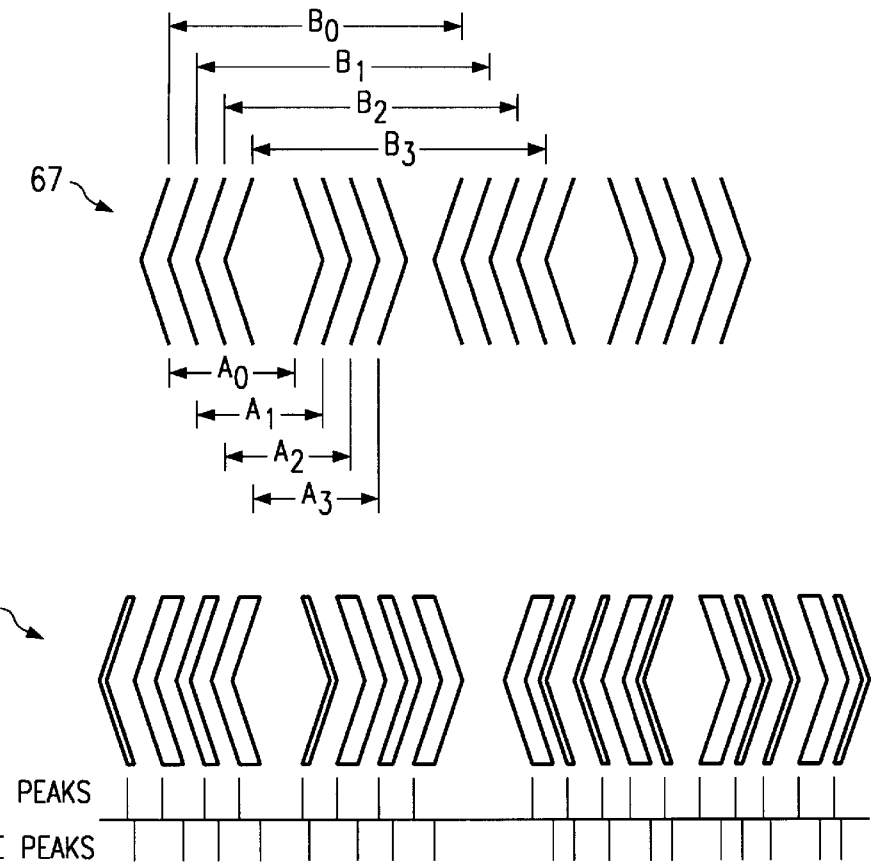
FIG. 10 is a representation of an encoded data pattern employing an alternative combined servo and encoded data pattern in accordance with the present invention.

A "dual transition" pattern is illustrated in FIG. 10, where data is encoded by varying the widths of the dual transitions 65. Typically, servo chevrons comprise two actual transitions, a first transition having a first switch in magnetic polarity followed by an opposite switch in polarity. But, typically, the servo system only reads or recognizes one direction of polarity switching, ignoring the other. For comparison, the "transitions" of the previously described patterns are of the typical type and, although the chevrons have two opposite polarity transitions, they are regarded as a single transition.

The embodiment of the invention represented in FIG. 10 takes advantage of such typical servo systems by employing one of the opposite polarity transitions as servo data, and employing the other of the polarity transitions as encoded data. As shown by the data peaks 66, reading from left to right, the leading edge transition of chevrons 65 provides positive peaks, and the trailing edge transition of the chevrons provides negative peaks. In the illustrated example, the leading edge positive peaks comprise the servo information as illustrated in servo pattern 67, and the trailing edge negative peaks provide the encoded data. Thus, the width of the dual transitions is modulated to provide modulated intervals between each positive peak and the following negative peak for decoding the data.

The modulation or encoding of the dual transition widths may take either of two forms. In one form, the modulation may be the distance between the leading and trailing edges, or the timing between the positive and negative transitions. In another form, the modulation may be the distance between the trailing edges, or the timing between the negative transitions.

Figure 11:
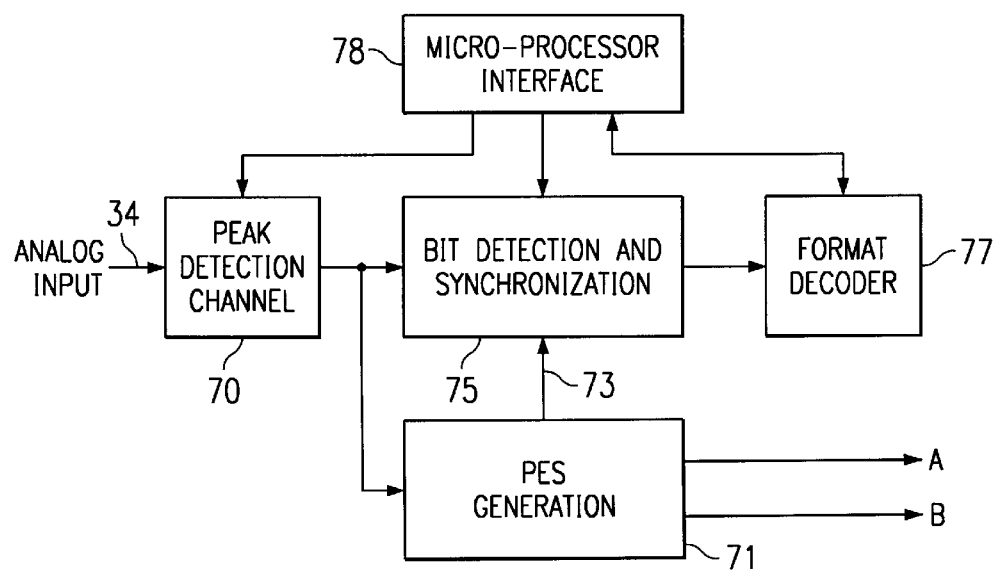
FIG. 11 is a block diagram of an embodiment of a data decoding system in accordance with the present invention.

FIG. 11 is a block diagram of an embodiment of a data decoding system in accordance with the present invention which is incorporated in servo signal decoder 36 of FIG. 2.

The analog output of the servo head is provided on line 34 to a peak detection channel 70 which provides output signals of the positive and negative peaks of the servo transitions to servo position error signal (PES) generation circuitry 71 of the incorporated Albrecht et al. application. In addition to providing the PES to control the servoing of the head in the transverse direction in order to center the head over the track, PES circuitry 71 also provides signals indicating the various gaps between the chevrons, as described in the Albrecht et al. application. Referring additionally to FIG. 8, PES circuitry 71 counts the chevrons to establish the longitudinal position of the servo head with respect to the chevrons and provides one of four signals at each gap. Specifically, OUT1 is provided upon counting the five following chevrons of a diamond pattern, CLR1 is provided upon counting the next four chevrons and sensing a gap, OUT2 is provided upon counting the following four chevrons of the diamond pattern, and CLR2 is provided upon counting the next five chevrons and sensing a gap. PES circuitry provides these signals on lines 73 in FIG. 11 to bit detection and synchronization logic 75.

The output signals of peak detection channel 70 are also supplied to bit detection and synchronization logic 75. Logic circuitry 75 decodes the detected positive peaks of the chevron transitions of FIGS. 8 or 9, or the positive and negative peaks of the chevron transitions of FIG. 10, based on the intervals between the peaks to decode the encoded data bits. The bits are supplied to format decoder 77 to be formatted into words and the resultant data stream is then supplied to the tape drive controller microprocessor over interface 78.

The logic circuitry of FIG. 11 may take many forms and are a matter of preference by the logic designer. The following description is one example of the many forms that may be utilized.

FIG. 12 presents two alternatives for the peak detection channel 70 of FIG. 11. FIG. 12A comprises an analog peak detection channel which is well known to those skilled in the art for detecting the peaks of the output from the servo head at line 34. The peak detection channel of FIG. 12A provides an output signal on line 80 having a timing designating the timing of the peak of the analog signal received on line 34. FIG. 12B comprises a digital peak detection channel which performs the same function as the analog peak detection channel by providing an output signal on line 80 having a timing designating the timing of the peak of the analog signal received on line 34 within a given sample time. A digital peak detection channel also employs an asynchronous clock so that a digital signal may be provided on line 81 indicating the precise peak arrival time, for decreasing the chance of error with respect to the peak detection. Digital peak detection channels are also well known to those of skill in the art, and the choice between circuitry such as that of FIG. 12A and circuitry such as that of FIG. 12B will be made by the designer.

An example of logic circuitry to perform the function of bit detection and synchronization logic 75 will be described briefly with reference to FIGS. 13–20. In the figures, "B state" represents the current bit or bit state, and "P state" represents the previous bit or bit state of the bit decoder.

Referring to FIG. 13, bit detection control logic 83 determines the state of the received peak, e.g., which of the transitions the peak represents, and provides a digital signal on lines 84 indicating the state of the detected peak. Bit detection logic 85 determines, based on the timing of the intervals between the peaks whose state was identified by bit detection control logic 83, the bits (in pairs or dibit form) encoded in the transitions, and provides the dibits on lines 86. PLL 87 responds to the OUT1 and OUT2 signals to provide a sample clock signal which indicates the gap between diamonds and thereby controls the output of a new dibit from bit detection logic 85. PLL 87 provides sample clock signals at rates of about 20 to 30 megahertz. The interval clock employed by bit detection logic 85 to determine the interval between peaks operates at about 20 to 50 times the sample clock rate.

An example of bit detection control logic 83 is illustrated by reference to the logic block diagram of FIG. 14 and the flow diagram of FIG. 15. State machine combinatorial logic 90 preferably comprises fixed combinatorial logic created by high level logic design language. For the illustrated example, the state machine 90 operates in accordance with the flow chart of FIG. 15.

Each of the gap signals received from the PES logic is ORed to provide a state machine reset signal (SMReset) on line 91. At the beginning state of the state machine, having been reset by the SMReset signal, the state provided on line 84 is 0. As illustrated in FIG. 15, the SMReset signal may be received at any time, resetting the machine to 0. This is to insure that the state machine always begins at the correct point, even if one of the peaks was not detected. The state machine then waits for the first peak in state 1, recycling with each interval pulse until the peak is detected. Upon detection, the state machine is incremented to state 2, which identifies that the first interval $D_0$ between the first transition or chevron and the second chevron is in process and is to be timed by the bit detection logic 85 of FIG. 13. Upon detection of the second peak, the machine changes to state 3, indicating the next transition or second chevron has been identified, ending the $D_0$ interval, and beginning the timing of the $D_1$ interval. The process continues until all three intervals $D_0$, $D_1$ and $D_2$ for the encoded data have been identified at state 5. The last chevron in the instance of the five chevron diamond, is identified at state 6 as $D_3$, for synch marks. Upon encountering one of the gaps, SMReset resets the state machine to state 0.

Figure 14:
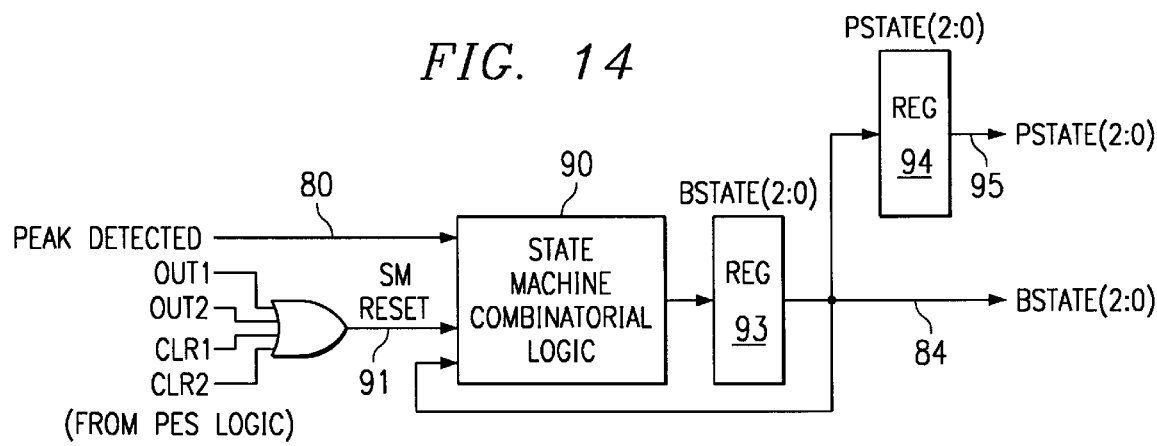
FIG. 14 is a block diagram of a bit detector state machine employed in the bit detector of FIG. 13.
Figure 15:
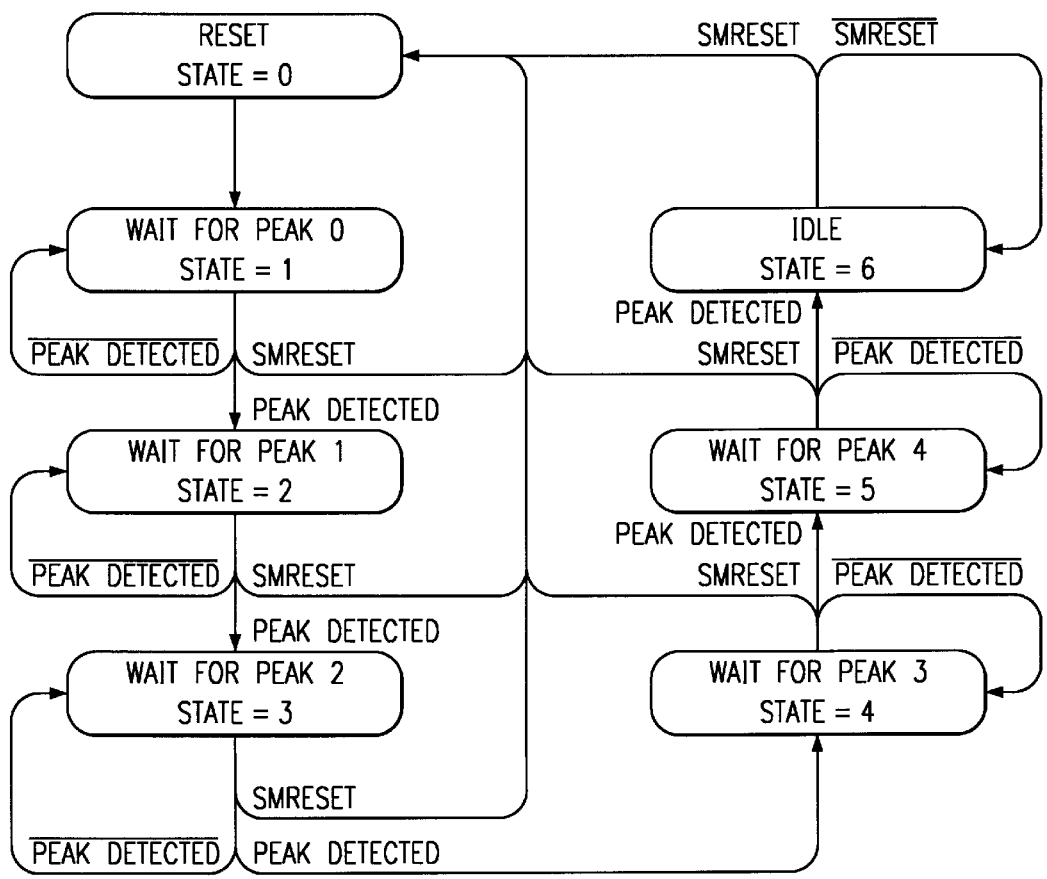
FIG. 15 is a flow diagram of the bit detector state machine of FIG. 14.

In FIG. 14, the state signals are stored in register 93 until updated, and the stored state signals provided on lines 84. When updated, the current state becomes the previous state and is stored in register 94 and provided on lines 95.

Bit detection logic 85 of FIG. 13 is described with reference to FIGS. 16–17.

Figure 16:
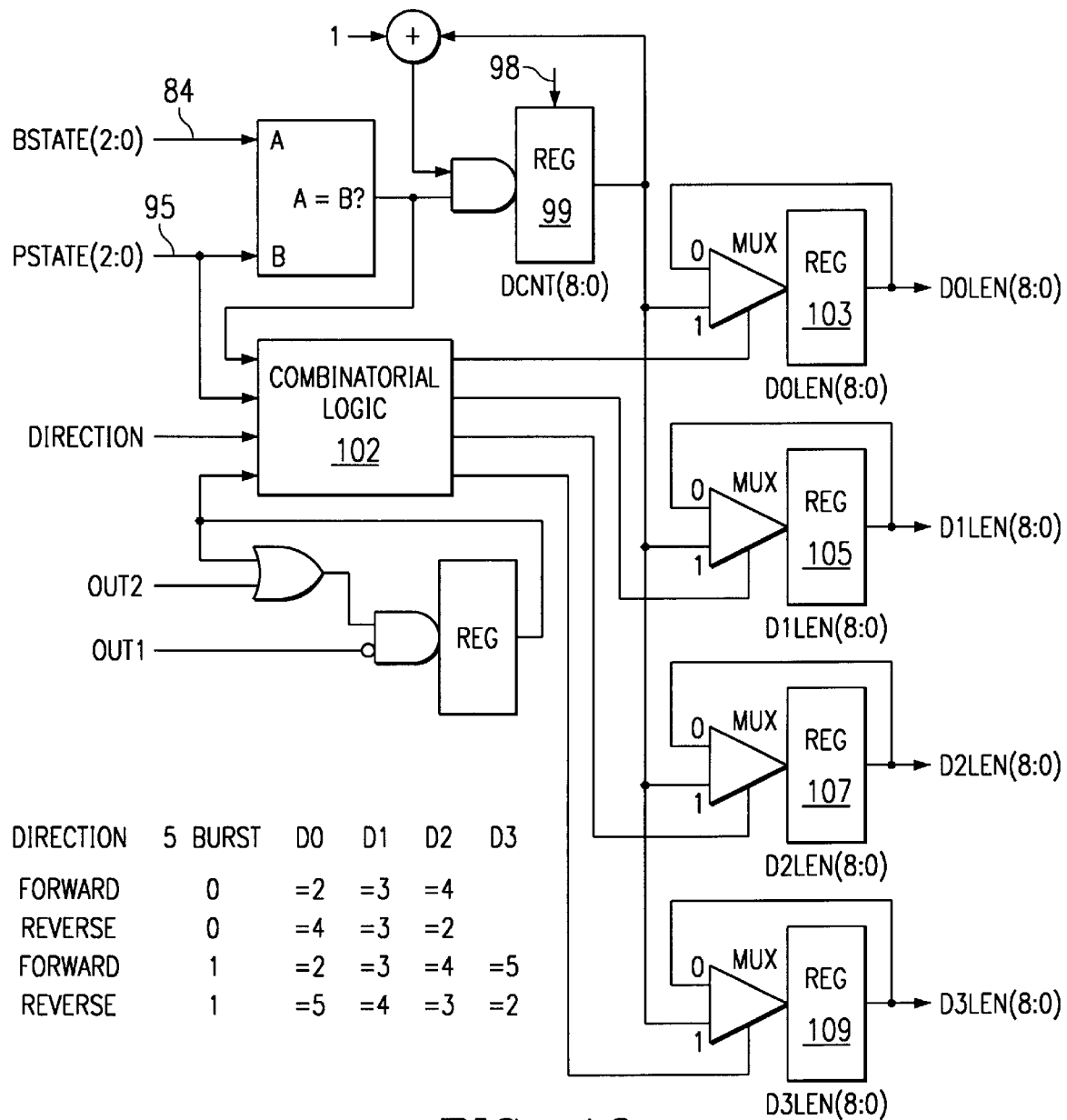
FIG. 16 is a block diagram of a length measurement detector employed in the bit detector of FIG. 13.

In FIG. 16, the high rate interval clock signal is supplied on line 98 to interval counter 99. Comparator 101 resets counter 99 each time there is a state change. To account for the bidirectional tape motion, combinatorial logic 102 is provided for responding to the tape direction and the states of the state machine to gate the appropriate counts of counter 99 to appropriate interval length registers 103, 105, 107 and 109. The combinatorial logic is preferably fixed logic created by high level logic design language. The logic is illustrated in FIG. 16, where "F" indicates that the tape is moving in the forward direction, "R" indicates that the tape is moving in the reverse direction, "5 Burst" "0" indicates a 4 chevron burst, "5 Burst" "1" indicates a 5 chevron burst, and the numbers below "D0", "D1", and "D2" and "D3" indicate the states of the state machine for providing the D0, D1, D2 and $D_3$ intervals. For example, with the tape moving in the forward direction with a 4 chevron burst, combinatorial logic 102 gates the count of interval counter 99 to DOLEN register 103 upon detecting state 2, providing the interval count representing the $D_0$ interval length. Combinatorial logic then gates the count of interval length $D_1$ to register 105, and gates the count of interval length $D_2$ to register 107. If a five chevron group is detected, combinatorial logic gates the count of interval length $D_3$ to register 109.

Figure 17:
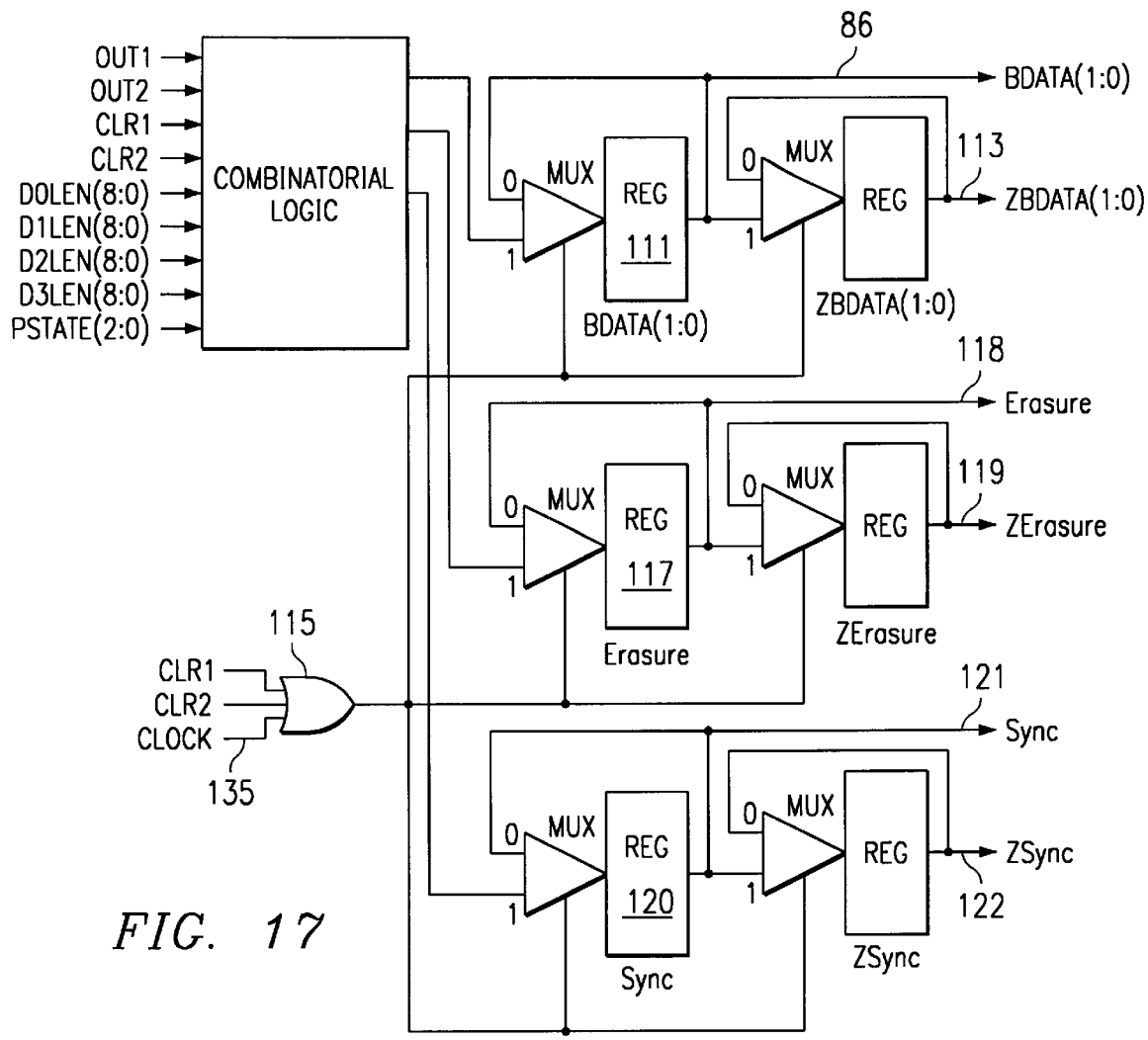
FIG. 17 is a block diagram of a bit decoder employed in the bit detector of FIG. 13.

Referring additionally to FIG. 17, the outputs of the interval length registers are provided to combinatorial logic 110 for decoding in accordance with the logic illustrated in FIG. 7. Combinatorial logic is preferably fixed logic created by high level logic design language. The decoded dibit is stored in register 111 and provided on output line 86 as also illustrated in FIG. 13. A delayed dibit is stored in register 112 and provided on output line 113. The delayed dibit is provided in this embodiment because both chevrons of each diamond are simultaneously written and are identically modulated and the delayed dibit provides error checking by matching the two dibits.

Still referring to FIG. 17, OR circuit 115 responds to CLR 1 or CLR 2 from the PES circuitry or to the PLL clock to update the registers.

If the combinatorial logic 110 does not receive the correct sequence of lengths, or there is an error in precessing through all the states, an error is indicated and a signal provided to Erasure register 117 and provided on line 118 and delayed line 119 to indicate that the dibits provided on lines 86 and 113 may be incorrect.

As discussed above, the bits of the encoded data are preferably arranged in the form of words, separated by a synch mark in the current embodiment. Combinatorial logic 110 detects the synch mark and provides a signal to register 120 to gate a synch signal on line 121 and delayed line 122.

Figure 18:
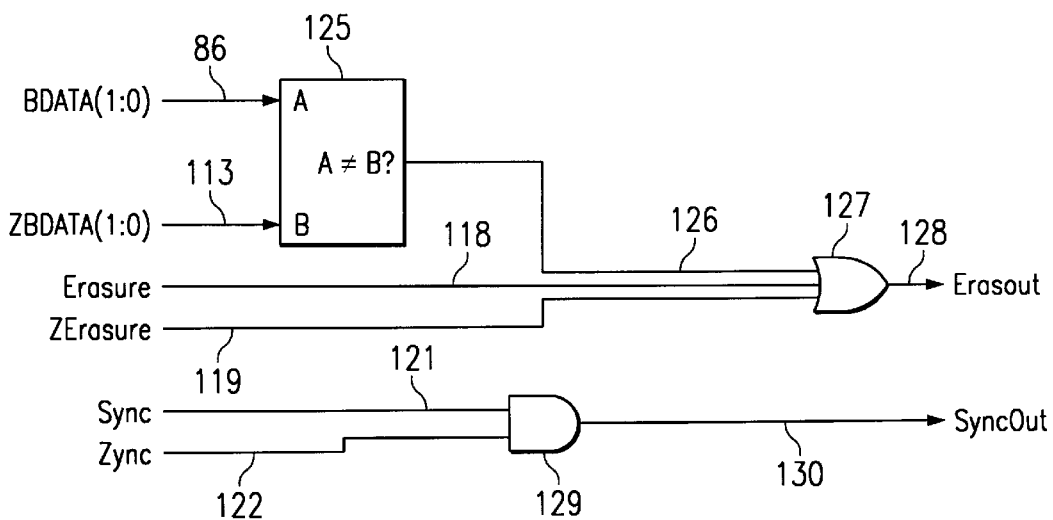
FIG. 18 is a block diagram of a bit detector output control employed in the bit detector of FIG. 13.

The need for the delayed signals is to avoid erroneous data by making sure the two chevrons patterns match. In FIG. 18, comparator 125 compares the current dibit from lines 86 to the delayed dibit from lines 113 to insure that they are the same. If not, an error is indicated on line 126. Any of the error signals indicated on line 126 or the erasure signals provided on line 118 or delayed line 119 is ORed at circuit 127 to provide an Eraseout error signal on line 128 at FIG. 13.

The synch signal and delayed synch signal on lines 121 and 122, respectively, are ANDed at circuit 129 and a SyncOut signal provided on line 130 of FIG. 13.

Figure 19:
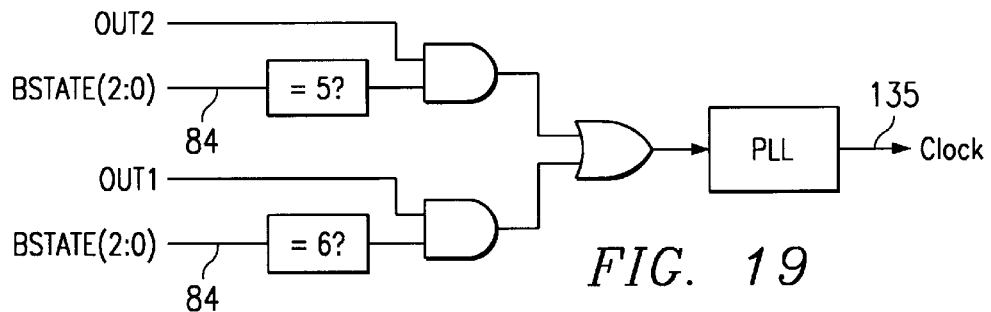
FIG. 19 is a block diagram of a phase-locked loop control employed in the bit detector of FIG. 13.
Figure 20:
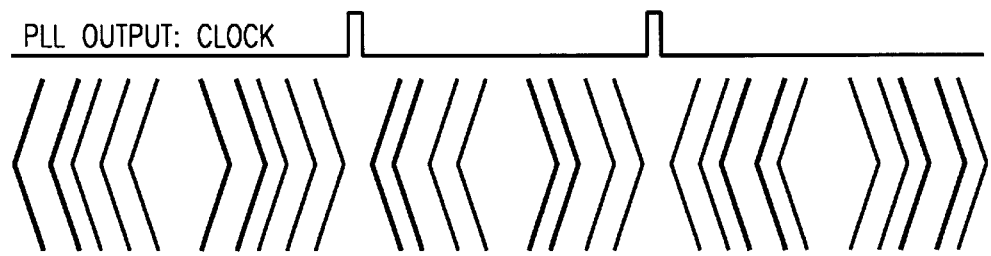
FIG. 20 is a combined pulse diagram and representation of a servo pattern for the phase-locked loop control of FIG. 19.

The PLL control logic 87 of FIG. 13 is illustrated by reference to the logic diagram of FIG. 19 and the combined diamond and pulse diagram of FIG. 20. Briefly, the PLL control logic responds to the combination of OUT2 and state 5, and to the combination of OUT1 and state 6, by providing a PLL sample clock pulse on line 135 of FIG. 13, which sample pulses indicate the gaps between diamonds.

Referring additionally to FIG. 13, the data decoded by the bit detection logic comprises 4 bits for each PLL clock.

Figure 21:
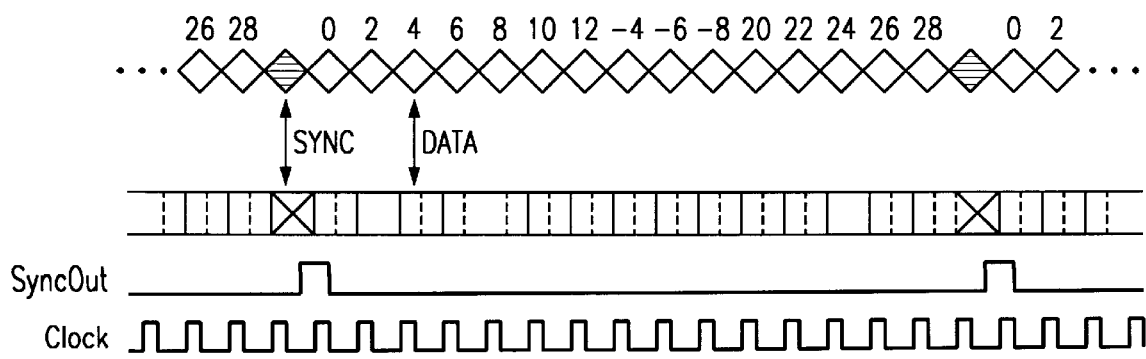
FIG. 21 is a combined pulse diagram and representation of a 32 bit format of the addressing data contained in the combined data and servo patterns of the present invention.

FIG. 21 depicts the arrangement of the words of data encoded in the servo diamond transitions. The dibits are illustrated as separated by dotted lines, and the four bits of each diamond are illustrated as separated by solid lines, and a full word is shown as separated by the synch signals.

Figure 22:
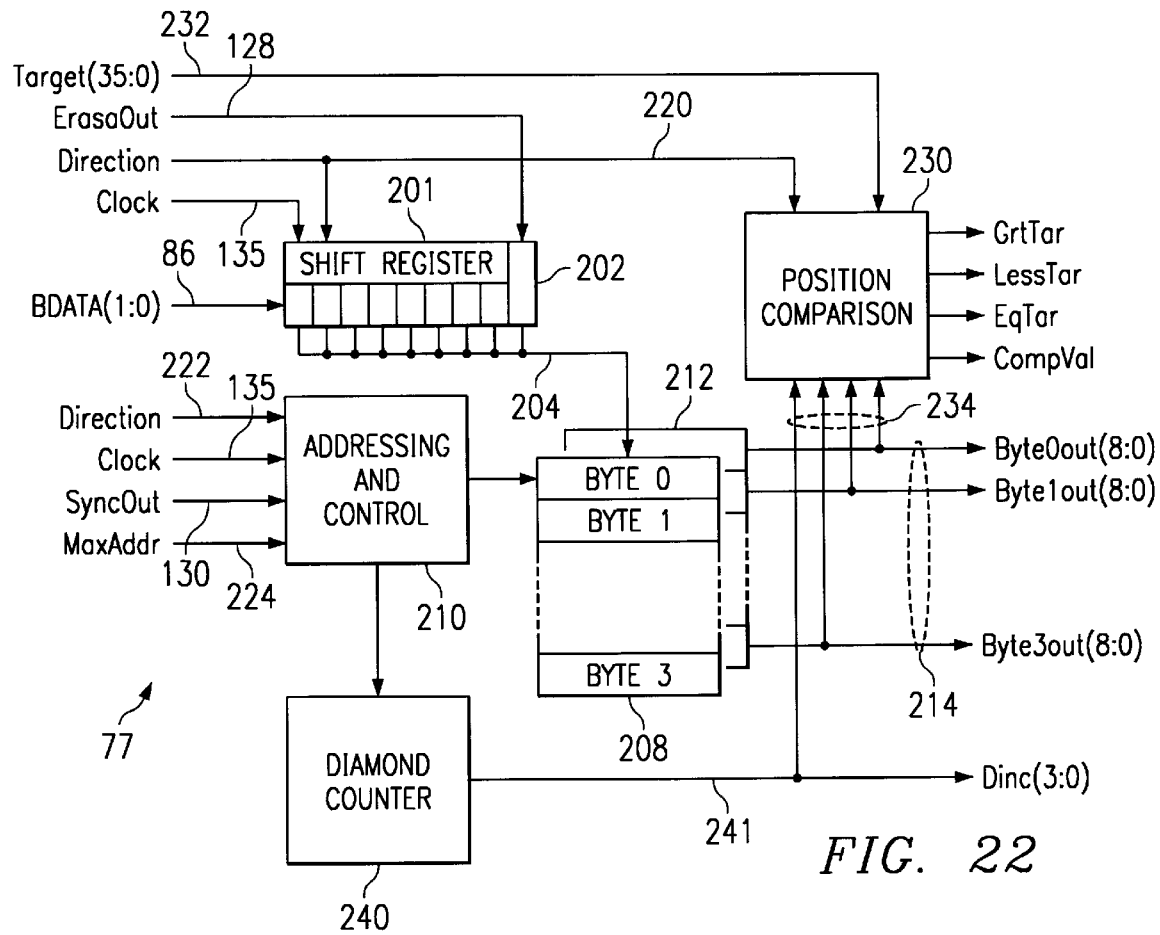
FIG. 22 is a block diagram of a format decoder employed in the data decoding system of FIG. 11.

An embodiment of format decoder 77 of FIG. 11 is illustrated in greater detail in FIG. 22. The dibits from the bit detection and synchronization logic are provided on line 86 to a shift register 201. An additional bit position 202 is provided in the shift register for the erase out signal from line 128. The shift register loads a byte of the superimposed data and transfers the byte of data over lines 204 to data byte registers 208. Addressing and control logic 210 causes the bytes to accumulate in the byte registers 208 until a word is complete and transfers the word to shadow byte registers 212. The superimposed data word is then available to be gated out of the shadow byte registers 212 on lines 214.

The superimposed data of the present embodiment may be read whether the tape is being moved forward or backward. Thus, the tape drive controller identifies the tape direction on line 220 to shift register 201 to control the direction of loading the bits into the shift register, and on line 222 to addressing and control logic 210 to control the direction of loading the byte registers 208. In order to load the bytes backward, the tape drive controller also identifies the maximum number of bytes in a word on lines 224.

For the purpose of providing a more direct longitudinal positioning feedback to the tape drive than relying on transmission of the superimposed data to the tape drive controller microprocessor, position comparison logic 230 may be provided. The tape drive controller provides a target address on lines 232, and the position comparison logic compares the target address to the address of the data from the shadow byte registers on lines 234.

In the event a closer identification of position is desired, diamond counter 240 is provided which identifies the current position within the word, based on the number of the diamond whose data is being transferred to the byte register 208. This diamond count is provided to the tape drive controller and to the position comparison logic 230 on lines 241.

Figure 23:
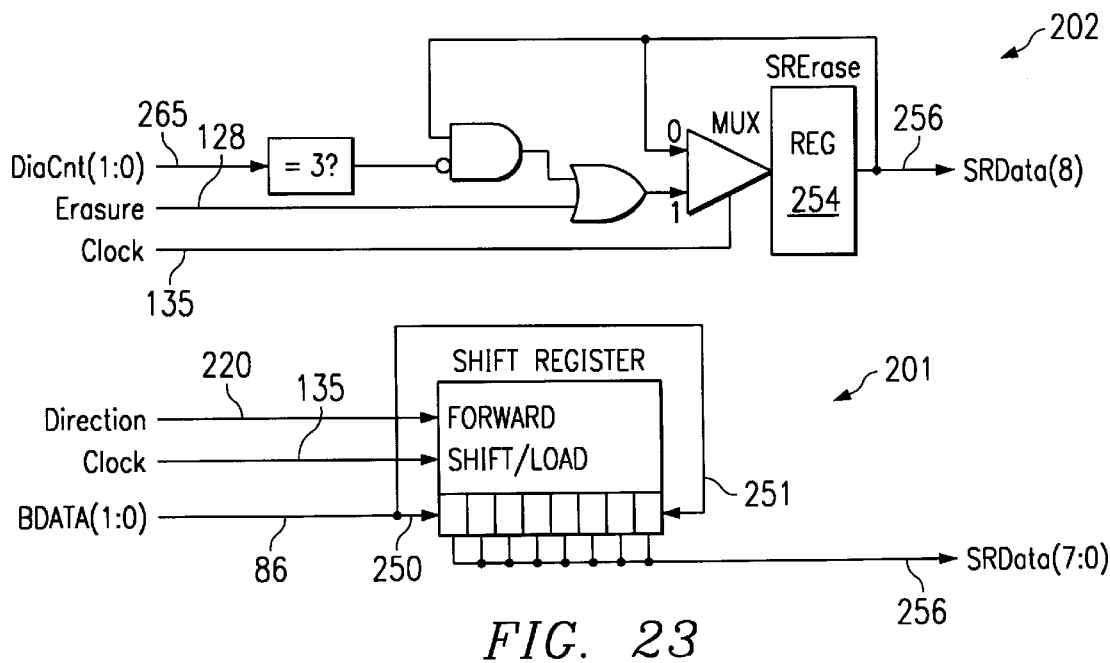
FIGS. 23, 24, 25 and 26 are detailed block diagrams of elements of the format decoder of FIG. 22.

FIG. 23 illustrates the erasure bit logic 202 and the shift register 201 of FIG. 22 in greater detail. Based upon the direction signal on line 220, shift register 201 either loads the superimposed data bits on lines 86 into the forward 250 or reverse 251 side of the shift register, and the shift register either shifts in the forward or the reverse direction. Each dibit is loaded upon the receipt of a sample pulse from the PLL on line 135. The erasure bit is maintained a "0" in register 254 until an erasure signal is received on line 128 together with a clock signal on line 135. The erasure bit is then changed to "1" and maintained until a new byte is being received as indicated on line 265. The shift register output of 9 bits is provided on lines 256.

Figure 24:
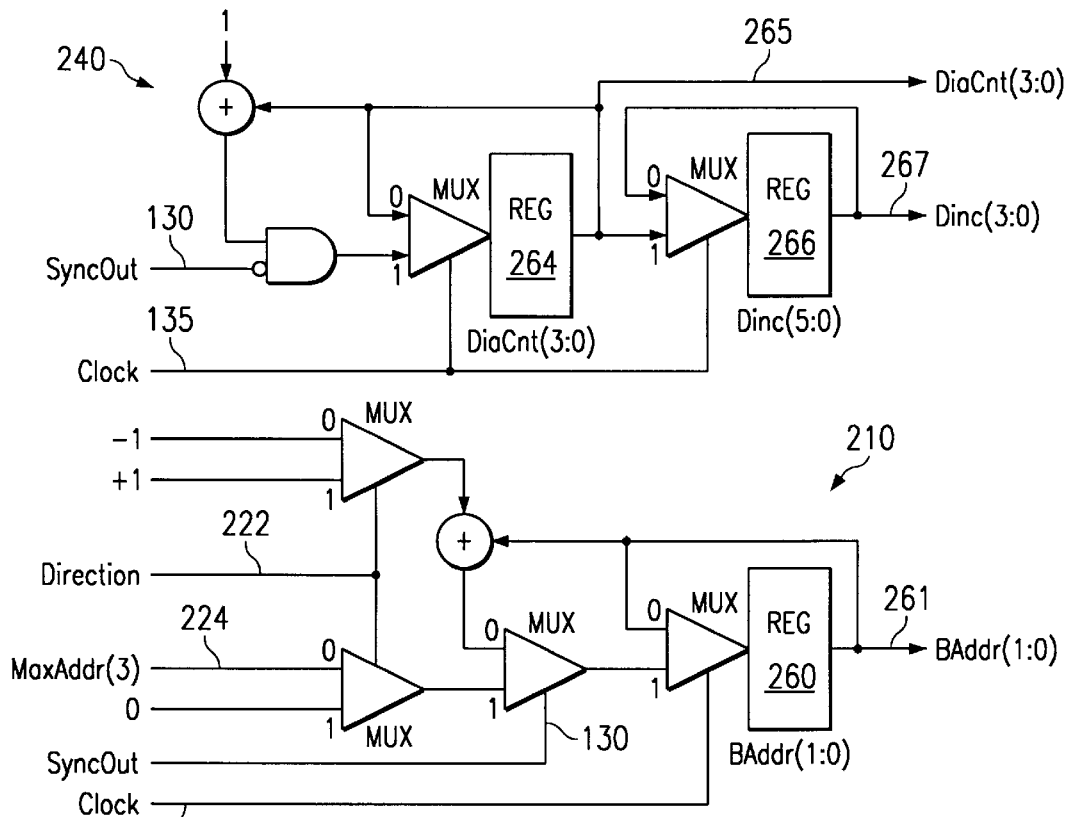

Byte addressing and control logic 210 and diamond counter 240 of FIG. 22 are illustrated in FIG. 24. The forward or reverse direction signal received on line 222 operates the addressing logic to either load a "0" or the maximum byte address from line 224 into the address register 260 and to either increment the address from "0" or decrement the address from the maximum. The address register is reset upon the receipt of a synch identifier on line 130, which indicates the beginning of a new word. Address register 260 is then incremented or decremented at each sample time from the PLL at line 135. Alternatively, the byte address may be divided by the number of bits in a byte to provide a byte identification. Diamond counter 240 comprises a register 264 which is incremented each sample clock and reset at each synch pulse from line 130 when gated by the clock signal 135, which, in the illustrated embodiment, is at count "15". The diamond count is provided on line 265. The count is also provided to register 266, which delays the diamond count one clock period to operate the shadow register, as will be explained.

Figure 25:
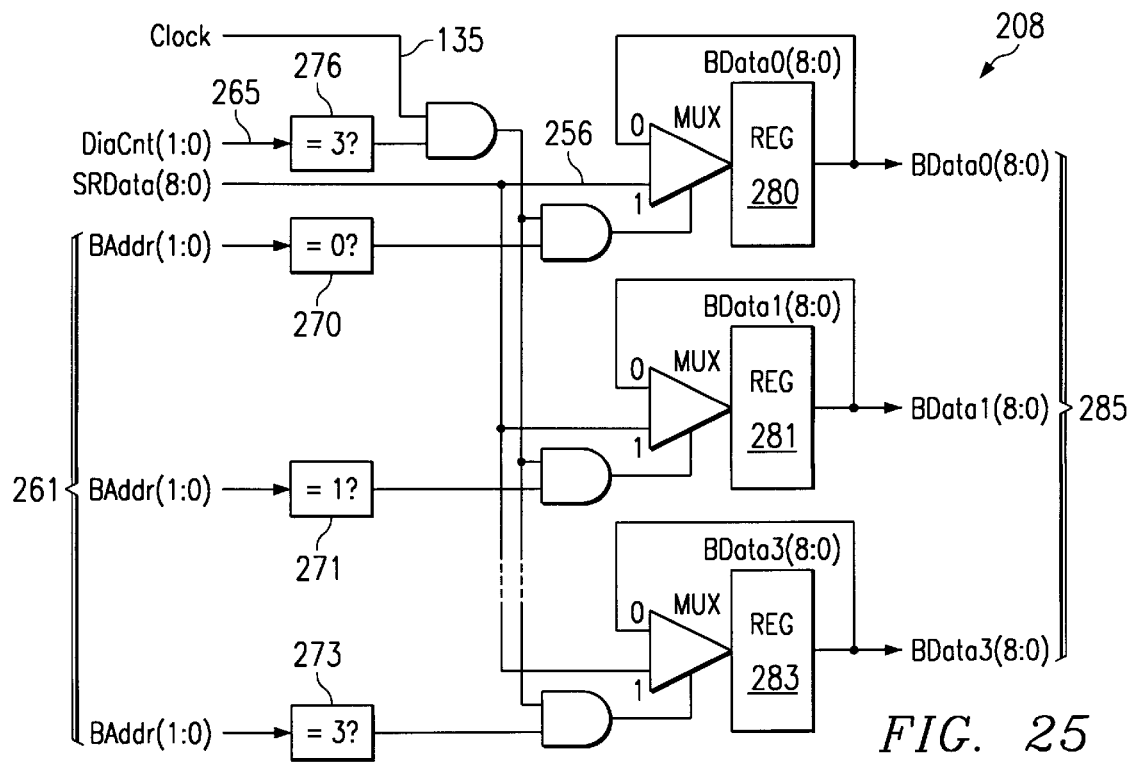
Figure 26:
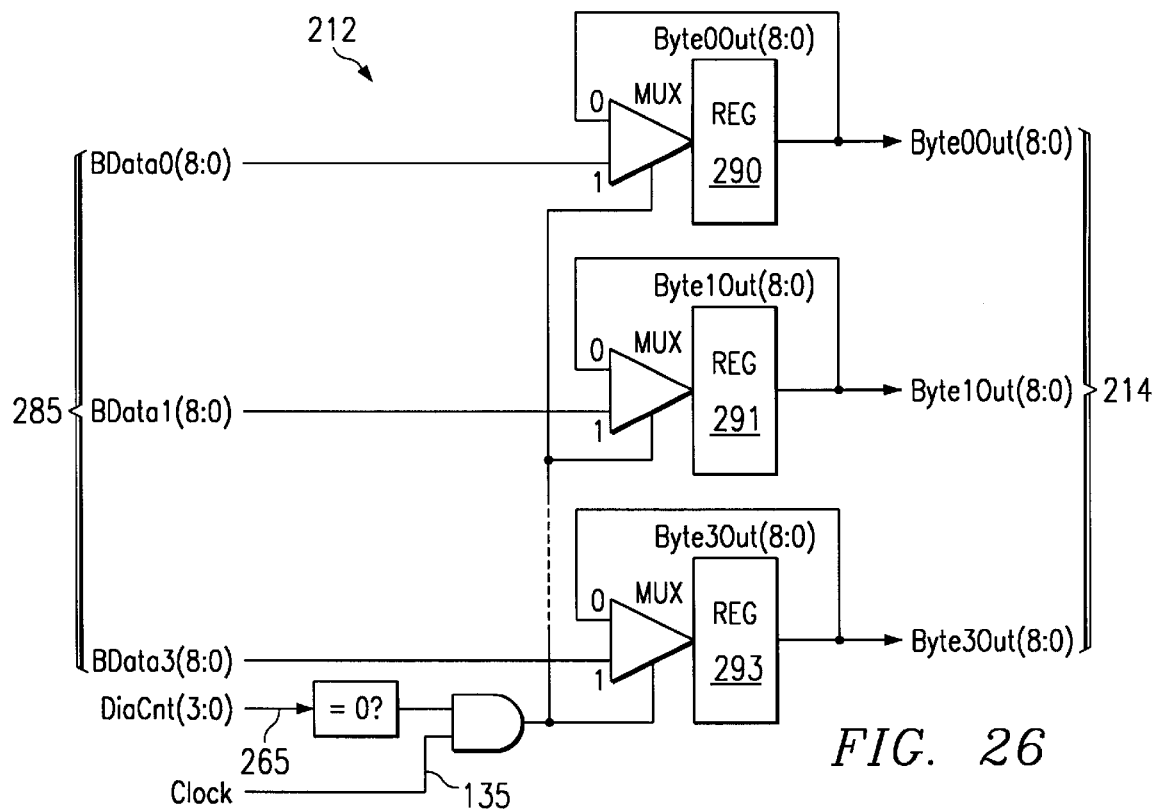

FIGS. 25 and 26 illustrate the byte registers 208 and shadow byte registers 212 of FIG. 22, respectively. Byte address information from line 261 in FIG. 24 is supplied to comparators 271–273. Diamond counter output of line 265 is supplied to comparator 276, so that the combination of a sample clock signal on line 135 with a diamond count of 3, gates the contents of the shift register from lines 256 to the one of registers 280–283 designated by the byte address indicated by the comparators 270–273. As the registers 280–283 are filled, the data comprising the full word of superimposed data is assembled in the registers. This data is available on lines 285.

Upon filling the registers 280–283, the full word of superimposed data is complete and available on lines 285. At about that time, the diamond counter is reset to "0" and the "0" count is detected by comparator 289 which gates lines 285 to a corresponding set of shadow registers 290–293. The shadow register output then comprises the complete superimposed word, which is maintained until the next word is completed.

The shadow register output is provided on lines 214 as illustrated in FIG. 22 and comprises the output of format decoder 77 in FIG. 11, which is provided to the tape drive controller over interface 78.

One skilled in the art will recognize that many alternatives exist to provide the logic to extract the superimposed data from the servo transitions.

An example of an alternative to use of a synch character for the format decoder is the use of a data code which includes characters which can generate a synch mark, as will be described.

An example of data encoding particularly suitable for encoding sequential tachometer data in the four bit pattern of each diamond comprises a base 13 system.

The base 13 technique for encoding the numbers uses 4 bit symbols which will create a (0,4) data stream with a higher information content and simpler hardware realization than the 8/9 (0,3) code.

A key point is that no special "synch mark" transition shifting arrangement is required to establish the word format. The synch mark occupies several bits in each word encoded with an excluded pattern. Other excluded patterns may be used for other purposes. Changing the 'k' constraint of the RLL code has no impact other than requiring that the minimum sync mark pattern which would work effectively is a 1 and 5 0's instead of a 1 and 4 0's—normally the 'k' constraint guarantees a PLL a minimum update rate, but that does not apply here. The (0,4) realization basically counts in base 13. That is if we look at four bit symbols, it can be seen that if we exclude 3 of them we create a system base 13 which will always encode to realize a (0,4) code, because no symbol begins or ends with more than 2 '0's:

| Base 16 | Base 13 | Base 13 shorthand |
|---------|---------|-------------------|
| 0000    | excluded | —                |
| 0001    | excluded | —                |
| 0010    | 0010    | C                 |
| 0011    | 0011    | B                 |
| 0100    | 0100    | A                 |
| 0101    | 0101    | 9                 |
| 0110    | 0110    | 8                 |
| 0111    | 0111    | 7                 |
| 1000    | excluded | —                |
| 1001    | 1001    | 6                 |
| 1010    | 1010    | 5                 |
| 1011    | 1011    | 4                 |
| 1100    | 1100    | 3                 |
| 1101    | 1101    | 2                 |
| 1110    | 1110    | 1                 |
| 1111    | 1111    | 0                 |

Figure 27:
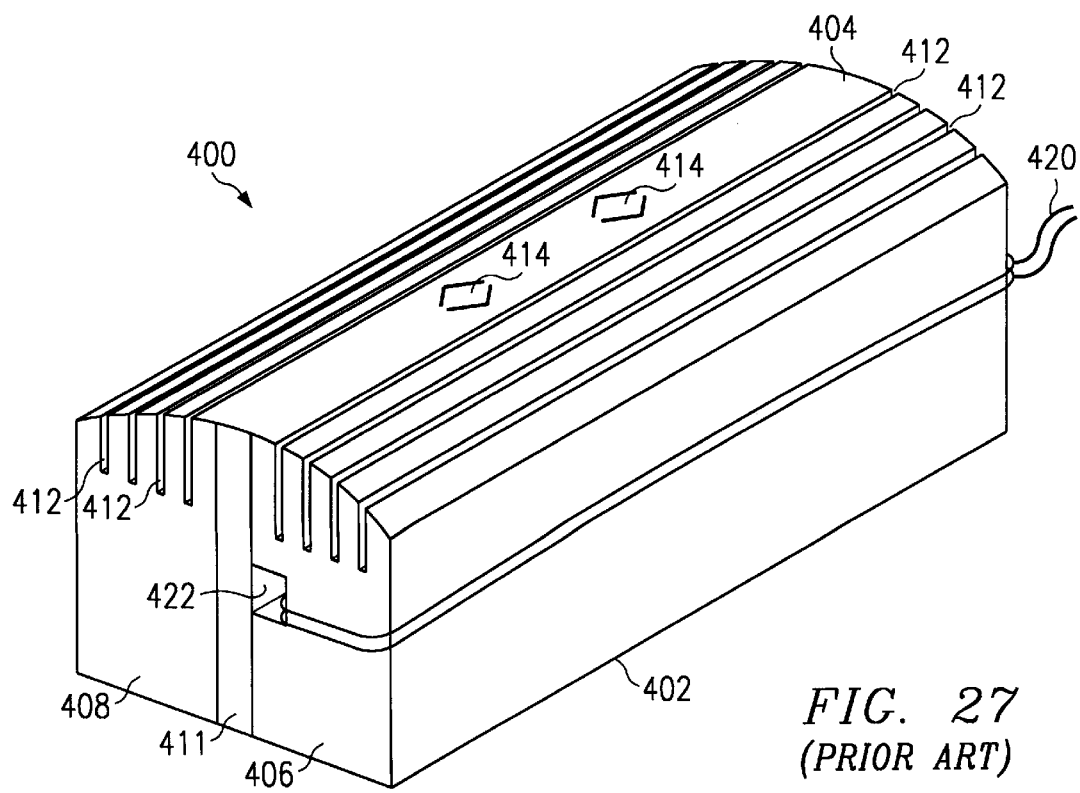
FIG. 27 is a perspective representation of a prior art multi-gap head that can write the transitions of the present invention.

FIG. 27 is taken from the Albrecht et al. application and comprises a head 402 for recording the chevron or diamond servo pattern, employing patterned gaps 414.

Figure 28:
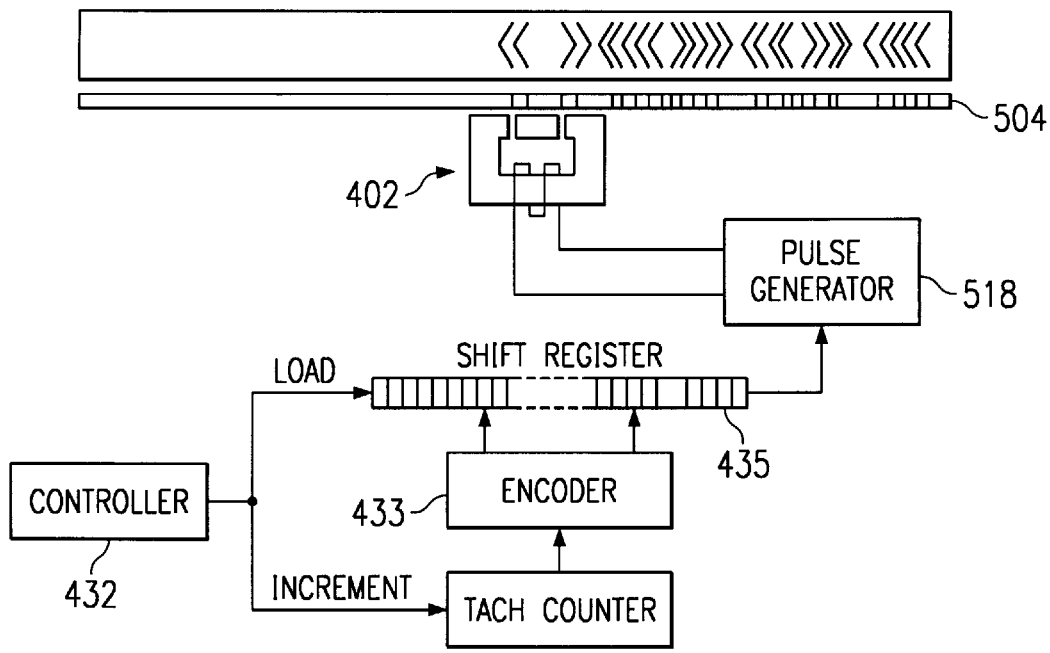
FIG. 28 is a schematic and block diagram representation of a writing generator for writing the transitions of the present invention.
Figure 29:
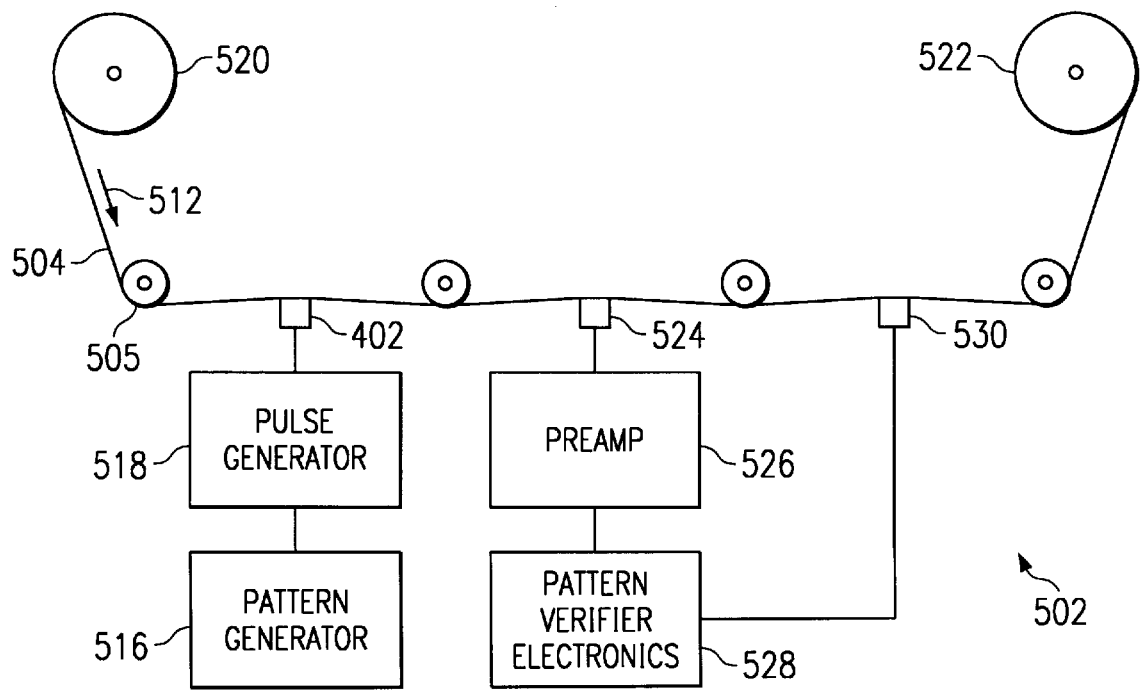
FIG. 29 is an overall schematic representation of the writing system of FIGS. 27 and 28.

In FIG. 28 and 29, head 402 is illustrated as writing the servo pattern on a tape 504, which is moved between reels 520 and 522 in the direction of arrow 512. Pattern generator 516 of FIG. 28 is illustrate in FIG. 27 and comprises a controller 432 and encoder 433. The encoded data is loaded from the encoder to shift register 435 under the control of the controller and is shifted to pulse generator 518. The shift register represents the timing of the supply of pulses by the pulse generator to cause head 402 to write the chevron on tape 402. Thus, rather than a regular repeating chevron pattern of the Albrecht et al. application, the shift register data controls the timing of the pulse detector much more precisely so as to shift the chevrons to superimpose the desired data on the servo pattern.

The pattern generator and pulse generator are depicted as tied to both patterned gaps 414 of head 402. alternatively, the pattern generator and separate pulse generators may be connected to each chevron of gaps 414, to provide different data to each chevron.

Referring to FIG. 29, the encoded servo pattern is detected by read head 524, amplified by circuit 526 and verified by pattern verifier 528.

Figure 30:
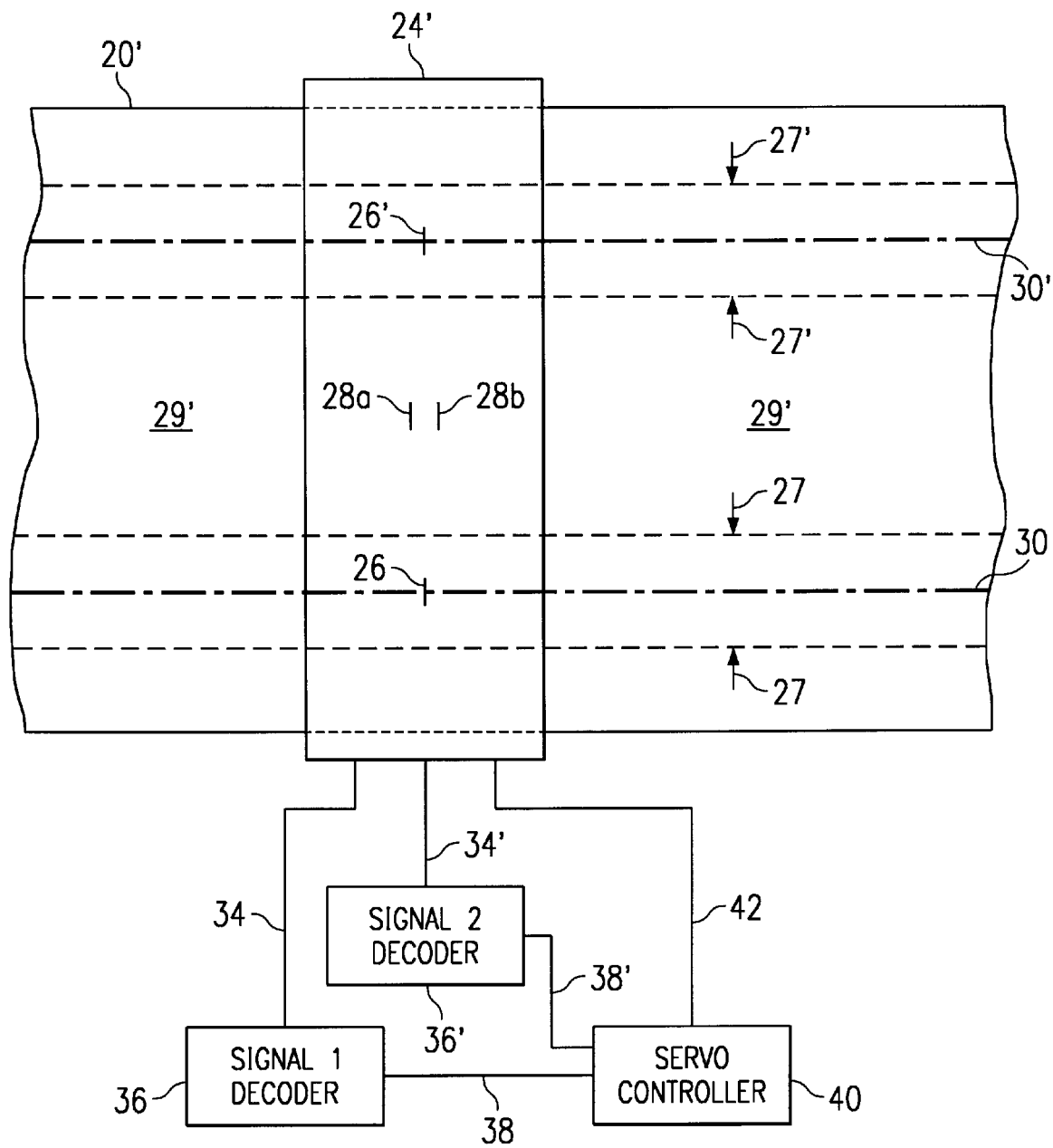
FIG. 30 is a schematic and block diagram representation of a multi-track servo and data system in accordance with the present invention.

FIG. 30 illustrates a duplicate servo and superimposed data system, having duplicate servo tracks 27 and 27', read by servo read heads 26 and 26' of head assembly 24'. The servo tracks are read simultaneously and provide a more accurate positioning of data head 28a and 28b by servoing the servo heads over both servo track centerlines 30 and 30', whose average or combined position is more accurate than that of a single head. Signal decoder 36' may be identical to that of signal decoder 36 and, employing the identical superimposed data decoding arrangement, provide additional data. As an example, servo track 27 may provide addressing data, and servo track 27' may provide a description of the tape which may be employed for indexing, such as the tape length, or may indicate the type of media, the manufacturer, etc.

While the preferred embodiments of the present invention have been illustrated in detail, it should be apparent that modifications and adaptations to those embodiments may occur to one skilled in the art without departing from the scope of the present invention as set forth in the following claims.

We claim:

1. A sensible transition pattern for recording combined servo and data information on a recording medium defining at least one longitudinal track, comprising:
 a burst pattern of at least two repeated pairs of non-parallel sensible transitions, at least one of which transitions of each pair is continuously longitudinally variable transverse to said track, said non-parallel transitions comprising servo information, at least two of said transitions of said repeated pairs shifted longitudinally with respect to other of said transitions of said repeated pairs, said shifted transitions comprising data information.

2. The sensible transition pattern of claim 1, wherein said burst pattern repeated pairs of transitions comprise parallel first transitions of said pairs and parallel second transitions of said pairs.

3. The sensible transition pattern of claim 2, wherein said burst pattern repeated pairs of transitions are interlaced such that first transitions of said pairs are grouped together and second transitions of said pairs are grouped together.

4. The sensible transition pattern of claim 1, comprising at least three said pairs of transitions wherein at least one group of two transitions of said repeated pairs are shifted longitudinally with respect to another transition of said repeated pairs to provide said data information.

5. The sensible transition pattern of claim 4, wherein said two transitions of said at least one group are shifted in opposite directions, respectively toward or away from each other, said shift toward each other representing one bit and said shift away from each other representing the opposite bit.

6. The sensible transition pattern of claim 4, wherein said group of two transitions comprises a pair of transitions, both said transitions of said pair shifted in the same direction, said shift in a first direction representing one bit and said shift in the opposite direction representing the opposite bit.

7. The sensible transition pattern of claim 1, comprising a plurality of said burst patterns, each of said two shifted transitions representing one bit in a set of data.

8. The sensible transition pattern of claim 7, wherein said set of data comprises address information.

9. The sensible transition pattern of claim 8, wherein said set of data comprises four bits representing 13 code words of address information.

10. The sensible transition pattern of claim 1, wherein one of said non-parallel transitions of said pairs is slanted in a straight line longitudinally transverse to said track.

11. The sensible transition pattern of claim 1 for providing longitudinal synchronization, comprising a plurality of said burst patterns having alternating numbers of said repeated pairs of non-parallel sensible transitions.

12. The sensible transition pattern of claim 11, comprising five repeated pairs of non-parallel sensible transitions in one alternating burst, and four repeated pairs of non-parallel sensible transitions in the other alternating burst.

13. A magnetic tape media having prerecorded combined servo and data information recorded in magnetic flux transition patterns defining at least one longitudinal servo track, comprising:
 a burst pattern of at least two repeated pairs of non-parallel magnetic flux transitions at least one of which transitions of each pair is continuously longitudinally variable across the width of said track, said pairs of non-parallel transitions comprising track following servo information defining said longitudinal track, at least two of said transitions of said repeated pairs shifted longitudinally with respect to other of said transitions of said repeated pairs, said shifted transitions comprising data information.

14. The magnetic tape media of claim 13, wherein said burst pattern repeated pairs of transitions are interlaced such that first transitions of said pairs are grouped together and second transitions of said pairs are grouped together.

15. The magnetic tape media of claim 13, wherein said burst pattern repeated pairs of transitions comprise parallel first transitions of said pairs and parallel second transitions of said pairs.

16. The magnetic tape media of claim 13, comprising at least three said pairs of transitions wherein at least one group of two of said transitions of said repeated pairs are shifted longitudinally with respect to another transition of said repeated pairs to provide said data information.

17. The magnetic tape media of claim 16, wherein said two transitions of said at least one group are shifted in opposite directions, respectively toward or away from each other, said shift toward each other representing one bit and said shift away from each other representing the opposite bit.

18. The magnetic tape media of claim 16, wherein said group of two transitions comprises a pair of transitions, both of said transitions of said pair shifted in the same direction, said shift in a first direction representing one bit and said shift in the opposite direction representing the opposite bit.

19. The magnetic tape media of claim 16, wherein said burst pattern repeated pairs of transitions are interlaced such that first transitions of said pairs are grouped together and second transitions of said pairs are grouped together and comprise said address information.

20. The magnetic tape media of claim 13, comprising a plurality of said burst patterns, each of said shifted pairs of transitions representing one bit in a set of data.

21. The magnetic tape media of claim 20, wherein said set of data comprises address information representing the longitudinal position along said tape media.

22. The magnetic tape media of claim 21, wherein said set of data comprises 4 bits representing 13 code words of address information.

23. The magnetic tape media of claim 13, wherein one of said non-parallel transitions of said pairs is slanted in a straight line longitudinally across the width of the track.

24. The magnetic tape media of claim 13 for providing longitudinal synchronization, comprising a plurality of said burst patterns having alternating numbers of said at least two repeated pairs of non-parallel magnetic flux transitions.

25. The magnetic tape media of claim 24, comprising five repeated pairs of non-parallel magnetic flux transitions in one alternating burst, and four repeated pairs of non-parallel magnetic flux transitions in the other alternating burst.

26. A magnetic tape media having prerecorded combined servo and data information recorded in magnetic flux transition patterns defining a plurality of parallel longitudinal servo tracks, comprising:
 a plurality of parallel burst patterns, each set of burst patterns representing one or more of said parallel longitudinal servo tracks, each set of burst patterns having at least two repeated pairs of non-parallel magnetic flux transitions at least one of which transitions of each pair is continuously longitudinally variable across the width of said track, said non-parallel transitions comprising track following servo information defining said parallel longitudinal tracks, at least two of said transitions of said repeated pairs in each of said plurality of parallel burst patterns shifted longitudinally with respect to other of said transitions of said repeated pairs in said burst pattern, said shifted transitions comprising data information.

27. The magnetic tape media of claim 26, wherein the data in one of said plurality of parallel burst patterns comprises addressing information relating to the longitudinal position along said magnetic tape media.

28. A data system for reading data superimposed in a servo pattern on a moving storage medium, said servo pattern having bursts of pairs of non-parallel sensible servo transitions that extend laterally with respect to said moving storage medium, said superimposed data comprising selected said transitions shifted longitudinally with respect to said moving storage medium, comprising:
   a servo transducer sensing said sensible servo transitions along said longitudinal direction with respect to said moving storage medium;
   a detector responsive to said sensed servo transitions that detects position shifts of ones of said non-parallel sensible transitions; and
   a decoder responsive to said detected position shifts that decodes said superimposed data.

29. The data system of claim 28, wherein said shifted non-parallel transitions are in groups of two, shifted in position longitudinally with respect to other of said non-parallel transitions to provide said superimposed data, and said detector detects the shift in position of said shifted groups of two transitions with respect to said other transitions.

30. The data system of claim 29, wherein a group of two of said shifted non-parallel transitions in each said burst are shifted in opposite longitudinal directions, respectively toward or away from each other, wherein said shift in position of said transitions toward each other represents one bit and said shift in position of said transitions away from each other represents the opposite bit, wherein said detector detects the shift in position of said shifted transitions toward or away from each other, and said decoder is responsive to said detection of the shift in position toward each other as one bit and responsive to said detection of the shift in position away from each other as an opposite bit.

31. The data system of claim 29, wherein a pair of said shifted non-parallel transitions in each said burst are shifted in the same of two opposite longitudinal directions, wherein said shift in position of said pairs in one said longitudinal direction represents one bit and in the opposite said longitudinal direction represents the opposite bit, wherein said detector detects the shift in position of said shifted pairs in said one longitudinal direction or in said opposite longitudinal direction, and said decoder is responsive to said detection of the shift in position in said one direction as one bit and responsive to said detection of the shift in position in said opposite direction as an opposite bit.

32. The data system of claim 29, wherein said shifted groups of two transitions each represents one bit in a set of data, and said decoder additionally decodes said set of data from said bits.

33. An addressing system for determining the longitudinal position on a moving magnetic storage medium from a servo pattern on said moving magnetic storage medium, said servo pattern having bursts of pairs of non-parallel magnetic flux servo transitions that extend laterally with respect to said moving magnetic storage medium, selected groups of two of said transitions shifted longitudinally with respect to said moving magnetic storage medium for encoding said address information, comprising:
   a servo transducer sensing said magnetic flux servo transitions along said longitudinal direction with respect to said moving magnetic storage medium and providing signals representative of said magnetic flux servo transitions;
   a detector responsive to said sensed servo transition signals that detects position shifts of ones of said groups of non-parallel magnetic flux transitions; and
   a decoder responsive to said detected position shifts that decodes said address information encoded in said position shifts.

34. The addressing system of claim 33, wherein said shifted groups of non-parallel transitions comprise pairs of transitions shifted in position longitudinally with respect to other pairs of non-parallel transitions to provide said encoded address information, and said detector detects the shift in position of said magnetic flux servo transitions to identify said shifted pairs with respect to said other pairs.

35. The addressing system of claim 33, wherein said shifted groups of non-parallel transitions in each said burst comprise two transitions shifted in opposite longitudinal directions, respectively toward or away from each other, and said detector detects the shift in position of said shifted groups of two transitions toward or away from each other.

36. The addressing system of claim 33, wherein one directional said shift in position of said groups of transitions represents one bit and an opposite directional said shift in position of said groups of transitions represents the opposite bit, and said decoder is responsive to said detection of said one directional shift in position as one bit and responsive to said detection of said opposite directional shift in position an opposite bit.

37. The addressing system of claim 36, wherein each of said shifted groups of two transitions represents one bit in a set of data, and said decoder additionally decodes said encoded address information from said set of data bits.

38. The addressing system of claim 37, wherein said burst patterns are arranged in sets of four groups of two transitions representing four bits of said encoded address information, and said decoder decodes said encoded address information in sets of four bits.

39. The addressing system of claim 38, wherein said sets of four groups of two transitions comprise 13 code words of address information, and said decoder decodes said encoded address information of said sets of four bits into ones of said 13 code words.

40. The addressing system of claim 37, wherein said burst pattern repeated pairs of transitions are interlaced such that first transitions of said pairs are grouped together and second transitions of said pairs are grouped together, and said detector is responsive to said groupings to detect said position shifts of said ones of said pairs of transitions.

41. An addressing system for determining the longitudinal position on a moving magnetic storage medium from one of a plurality of parallel longitudinal servo patterns on said moving magnetic storage medium, said servo patterns having bursts of pairs of non-parallel magnetic flux servo transitions that extend laterally with respect to said moving magnetic storage medium, selected groups of two of said transitions shifted longitudinally with respect to said moving magnetic storage medium, one of which longitudinal servo patterns encodes said address information, comprising:
   servo transducers sensing said magnetic flux servo transitions of each of said parallel longitudinal servo patterns along said longitudinal direction with respect to said moving magnetic storage medium and providing signals representative of said magnetic flux servo transitions;

a plurality of detectors, each responsive to said sensed servo transition signals of one of said transducers that detects position shifts of ones of said non-parallel magnetic flux transitions; and a decoder responsive to ones of said detected position shifts that decodes said address information encoded in said position shifts of said groups of two of said transitions.

42. In a timing based servo system for magnetic tape media, an addressing system for determining the longitudinal position on said magnetic tape media from a timing based servo pattern on said magnetic tape media, said timing based servo pattern having bursts of pairs of non-parallel magnetic flux servo transitions that extend laterally with respect to said magnetic tape media, selected groups of two of said transitions shifted longitudinally with respect to said magnetic tape media encoding said address information, said timing based servo system having a servo transducer sensing said magnetic flux servo transitions along said longitudinal direction with respect to said magnetic tape media, said addressing system comprising:

a detector responsive to said sensed servo transitions for detecting position shifts of ones of said non-parallel magnetic flux transitions; and a decoder responsive to said detected position shifts for decoding said address information encoded in said position shifts.

43. The addressing system of claim 42, wherein said groups of two shifted non-parallel transitions are shifted in position longitudinally by equal magnitudes with respect to other said non-parallel transitions to provide said encoded address information while preserving said time based servo pattern, and said detector detects the timing based spacing between said magnetic flux servo transitions to identify said shift in position of said shifted transitions with respect to said other transitions.

44. The addressing system of claim 43, wherein said groups of two of said shifted pairs of non-parallel transitions are shifted in opposite longitudinal directions, respectively toward or away from each other, and said detector detects the shift in position of said shifted transitions toward or away from each other.

45. The addressing system of claim 43, wherein said groups of two of said shifted non-parallel transitions comprise pairs of transitions shifted in the same directions, said pairs shifted away from or toward each, and said detector detects the shift in position of said shifted pairs toward or away from each other as said encoded address information.

46. The addressing system of claim 43, wherein one directional said shift in position of said groups of transitions represents one bit and an opposite directional said shift in position of said groups of transitions represents the opposite bit, and said decoder is responsive to said detection of said one directional shift in position as one bit and responsive to said detection of said opposite directional shift in position an opposite bit.

47. The addressing system of claim 46, wherein each of said shifted groups of two transitions represents one bit in a set of data, and said decoder additionally decodes said encoded address information from said set of data bits.

48. The addressing system of claim 47, wherein said burst patterns are arranged in sets of four groups of two transitions representing four bits of said encoded address information, and said decoder decodes said encoded address information in sets of four bits.

49. The addressing system of claim 46, wherein said burst pattern repeated pairs of transitions are interlaced such that first transitions of said pairs are grouped together and second transitions of said pairs are grouped together, and said detector is responsive to said groupings to detect said position shifts of said ones of said groups of transitions.

50. The addressing system of claim 42, wherein said plurality of said burst patterns have alternating numbers of said at least two repeated pairs of non-parallel magnetic flux transitions for providing longitudinal synchronization, and said detector is additionally responsive to said alternating numbers of transitions of said burst patterns for detecting the timing based spacing between said magnetic flux servo transitions to identify said shift in position of the ones of said groups of transitions having said position shifts.

51. The addressing system of claim 50, wherein said alternating burst patterns have five repeated pairs of non-parallel magnetic flux transitions in one alternating burst, and four repeated pairs of non-parallel magnetic flux transitions in the other alternating burst, and said detector is responsive to said alternating burst patterns for detecting the ones of said groups of transitions having said position shifts.

52. A magnetic tape drive having a combined servo control system and longitudinal addressing system for magnetic tape media, for determining the longitudinal position on said magnetic tape media from a servo pattern on said magnetic tape media, said servo pattern having bursts of pairs of non-parallel magnetic flux servo transitions that extend laterally with respect to said magnetic tape media, selected groups of two of said transitions shifted longitudinally with respect to said magnetic tape media encoding said address information, said magnetic tape drive comprising:

a magnetic read and/or write head and read/write channel for reading and/or writing data on said magnetic tape media;

a drive mechanism for moving said magnetic tape media longitudinally with respect to said magnetic read and/or write head for reading and/or writing on said magnetic tape media;

a servo transducer sensing said magnetic flux servo transitions along said longitudinal direction with respect to said magnetic tape media as said drive mechanism moves said magnetic tape longitudinally and providing signals representative of said magnetic flux servo transitions;

a detector responsive to said sensed servo transition signals for detecting the timing based spacing between said magnetic flux servo transitions to identify said position shifts of ones of said groups of two non-parallel magnetic flux transitions; and a decoder responsive to said detected position shifts for decoding said address information encoded in said position shifts.

53. The magnetic tape drive of claim 52, wherein said shifted groups of two non-parallel transitions are shifted in position longitudinally by equal magnitudes with respect to other non-parallel transitions to provide said encoded address information, and said detector detects the shifts in position of said shifted groups with respect to said other transitions.

54. The magnetic tape drive of claim 53, wherein said two shifted non-parallel transitions in each said group are shifted in opposite longitudinal directions, respectively toward or away from each other, and said detector detects the shift in position of said shifted transitions toward or away from each other.

55. The magnetic tape drive of claim 53, wherein said groups of two of said shifted non-parallel transitions comprise pairs of transitions shifted in the same directions, said pairs shifted away from or toward each, and said detector detects the shift in position of said shifted pairs toward or away from each other as said encoded address information.

56. The magnetic tape drive of claim 53, wherein one directional said shift in position of said groups of transitions represents one bit and an opposite directional said shift in position of said groups of transitions represents the opposite bit, and said decoder is responsive to said detection of said one directional shift in position as one bit and responsive to said detection of said opposite directional shift in position an opposite bit.

57. The magnetic tape drive of claim 56, wherein each of said shifted groups of two transitions represents one bit in a set of data, and said decoder additionally decodes said encoded address information from said set of data bits.

58. The magnetic tape drive of claim 57, wherein said groups of transitions are arranged in sets of four groups representing four bits of said encoded address information, and said decoder decodes said encoded address information in sets of four bits.

59. The magnetic tape drive of claim 58, wherein said sets of four groups comprise 13 code words of address information, and said decoder decodes said encoded address information of said sets of four bits into ones of said 13 code words.

60. The magnetic tape drive of claim 56, wherein said burst pattern repeated pairs of transitions are interlaced such that first transitions of said pairs are grouped together and second transitions of said pairs are grouped together and comprise said address information, and said detector is responsive to said groupings to detect said position shifts of said ones of said groups of transitions.

61. The magnetic tape drive of claim 52, wherein said plurality of said burst patterns have alternating numbers of said at least two repeated pairs of non-parallel magnetic flux transitions for providing longitudinal synchronization, and said detector is additionally responsive to said alternating numbers of transitions of said burst patterns for detecting the ones of said groups of transitions having said position shifts.

62. The magnetic tape drive of claim 61, wherein said alternating burst patterns have five repeated pairs of non-parallel magnetic flux transitions in one alternating burst, and four repeated pairs of non-parallel magnetic flux transitions in the other alternating burst, and said detector is responsive to said alternating burst patterns for detecting the ones of said groups of transitions having said position shifts.

63. A magnetic tape drive having a combined servo control system and longitudinal addressing system for magnetic tape media, for determining the longitudinal position on said magnetic tape media from one of a plurality of parallel longitudinal servo patterns on said magnetic tape media, said servo pattern having bursts of pairs of non-parallel magnetic flux servo transitions that extend laterally with respect to said magnetic tape media, selected groups of said transitions shifted longitudinally with respect to said magnetic tape media encoding said address information, said magnetic tape drive comprising:

a magnetic read and/or write head and read/write channel for reading and/or writing data in parallel longitudinal tracks on said magnetic tape media;

a drive mechanism for moving said magnetic tape media longitudinally with respect to said magnetic read and/or write head for reading and/or writing on said magnetic tape media;

a plurality of servo transducers, each sensing said magnetic flux servo transitions in one of said plurality of parallel longitudinal servo patterns along said longitudinal direction with respect to said magnetic tape media as said drive mechanism moves said magnetic tape longitudinally and providing signals representative of said magnetic flux servo transitions;

a detector responsive to said sensed servo transition signals of at least one of said servo transducers for detecting the timing based spacing between said magnetic flux servo transitions to identify said position shifts of ones of said groups of non-parallel magnetic flux transitions representing said encoded address information; and a decoder responsive to said detected position shifts for decoding said address information encoded in said position shifts.

64. The magnetic tape drive of claim 63, additionally comprising at least one detector responsive to said sensed servo transitions of other of said servo transducers for detecting the timing based spacing between said magnetic flux servo transitions of said transitions to identify said position shifts of ones of said groups of non-parallel magnetic flux transitions representing information other than said address information.

65. In a magnetic tape servo writer for writing prerecorded servo information recorded in magnetic flux transition patterns defining at least one longitudinal servo track, said servo writer having two spaced apart write elements having non-parallel gaps, at least one of which is continuously longitudinally variable across the width of the track, a drive for moving a magnetic tape longitudinally across said write elements at a predetermined velocity, and a source of timed pulses to cause said spaced apart write elements to write patterns corresponding to said non-parallel gaps, said patterns arranged in pairs comprising track following servo information defining said longitudinal servo track, a data writer for superimposing data on said magnetic flux transition patterns, comprising:

an encoder for encoding data into predetermined time shifts; and a pulse timer responsive to said encoder for shifting the timing of said source of timed pulses to thereby shift a pattern of at least a group of two non-parallel magnetic flux transitions longitudinally with respect to another of said pairs, said shifted pairs comprising data information.

66. The data writer of claim 65, wherein said encoder encodes sequential address data into said predetermined time shifts.

67. A magnetic tape servo and data writer for writing prerecorded servo information with data superimposed thereon recorded in magnetic flux transition patterns defining at least one longitudinal servo track, comprising:

two spaced apart write elements having non-parallel gaps, at least one of which is continuously longitudinally variable across the width of the track;

a drive for moving a magnetic tape longitudinally across said write elements at a predetermined velocity;

an encoder for encoding data into predetermined time shifts;

a source of timed pulses to cause said spaced apart write elements to write patterns corresponding to said non-parallel gaps, said patterns arranged in pairs comprising track following servo information defining said longitudinal servo track; and a pulse timer responsive to said encoder for shifting the timing of said source of timed pulses to thereby shift a pattern of at least a group of two of said non-parallel magnetic flux transitions longitudinally with respect to other of said transitions, said shifted groups of transitions comprising data information.

68. A method for superimposing data information in pairs of non-parallel servo transitions on a storage medium, employing two spaced apart write elements having non-parallel gaps, at least one of which is continuously longitudinally variable in a direction transverse to said storage medium, and a drive for moving said storage medium in the longitudinal direction across said write elements at a predetermined velocity, comprising the steps of:

encoding data information into predetermined time shifts;

providing timed pulses to said spaced apart write elements to simultaneously write patterns of pairs of servo transitions corresponding to said non-parallel gaps; and shifting the timing of said timed pulses in accordance with said predetermined time shifts to thereby shift at least a group of two of said non-parallel magnetic flux transitions longitudinally with respect to other of said transitions, said shifted transitions comprising data information.

69. A method for reading data superimposed in a servo pattern on a moving storage medium, said servo pattern having bursts of pairs of non-parallel sensible servo transitions that extend laterally with respect to said moving storage medium, said superimposed data comprising selected groups of two of said transitions shifted longitudinally with respect to said moving storage medium, comprising the steps of:

sensing said sensible servo transitions along said longitudinal direction with respect to said moving storage medium;

detecting, in response to said sensed servo transitions, position shifts of ones of said groups of two non-parallel sensible transitions; and decoding, in response to said detected position shifts, said superimposed data.

70. A sensible transition pattern for recording combined servo and data information on a recording medium defining at least one longitudinal track, comprising:

a burst pattern of at least two repeated pairs of non-parallel sensible dual transitions a least one of which dual transitions is continuously longitudinally variable transverse to said track, said non-parallel dual transitions comprising servo information, at least one of said sensible dual transitions having a different width than other said sensible transitions, said different width dual transitions comprising data information.

71. The sensible transition pattern of claim 70, wherein said burst pattern repeated pairs of dual transitions are interlaced such that first dual transitions of said pairs are grouped together and second dual transitions of said pairs are grouped together.

72. The sensible transition pattern of claim 70, wherein said burst pattern repeated pairs of dual transitions comprise parallel first transitions of said pairs and parallel second transitions of said pairs.

73. A magnetic tape media having prerecorded combined servo and data information recorded in magnetic flux transition patterns defining at least one longitudinal servo track, comprising:

a burst pattern of at least two repeated pairs of non-parallel magnetic flux dual transitions at least one of which dual transitions is continuously longitudinally variable across the width of the track, said pairs of non-parallel dual transitions comprising track following servo information defining said longitudinal track, at least one of said repeated pairs of dual transitions having a different width with respect to other of said dual transitions, said different width transitions comprising data information.

74. The magnetic tape media of claim 73, wherein one transition of said magnetic flux dual transitions is a positive-going transition, and the other transition of said magnetic flux dual transitions is a negative-going transition.

75. The magnetic tape media of claim 74, wherein said burst pattern repeated pairs of dual transitions are interlaced such that first dual transitions of said pairs are grouped together and second dual transitions of said pairs are grouped together.

76. The magnetic tape media of claim 74, wherein said burst pattern repeated pairs of dual transitions comprise parallel first dual transitions of said pairs and parallel second dual transitions of said pairs.

77. A data system for reading data superimposed in a servo pattern on a moving storage medium, said servo pattern having bursts of pairs of non-parallel sensible servo dual transitions that extend laterally with respect to said moving storage medium, said superimposed data comprising selected ones of said dual transitions of different width with respect to other said dual transitions, comprising:

a servo transducer sensing said sensible servo dual transitions along said longitudinal direction with respect to said moving storage medium;

a data detector responsive to said sensed servo dual transitions that detects said different width of ones of said non-parallel sensible dual transitions; and a decoder responsive to said detected different width transitions that decodes said superimposed data.

78. The data system of claim 77, wherein one transition of said sensible servo dual transitions is a positive-going transition, and the other transition of said sensible servo dual transitions is a negative-going transition, and said data system additionally comprises:

a servo detector responsive to only one of said positive-going or said negative-going transitions of each of said sensed servo dual transitions for detecting said servo information; and said data detector for detecting different width dual transitions is responsive to both said positive-going and said negative-going transitions of said sensed servo dual transitions.

79. The data system of claim 78, wherein said different transition width pairs of non-parallel transitions in each of said burst patterns represents one bit in a set of data, and said decoder additionally decodes said set of data from said bits.

80. The data system of claim 79, wherein said set of data comprises addresses representing a longitudinal position on said moving storage medium, and said decoder additionally decodes said longitudinal position address from said bits.

81. A magnetic tape drive having a combined servo control system and longitudinal addressing system for magnetic tape media, for determining the longitudinal position on said magnetic tape media from a servo pattern on said magnetic tape media, said servo pattern having bursts of pairs of non-parallel magnetic flux servo dual transitions that extend laterally with respect to said magnetic tape media, selected said dual transitions having different widths with respect to others of said dual transitions, encoding said address information, said magnetic tape drive comprising:

a magnetic read and/or write head and read/write channel for reading and/or writing data on said magnetic tape media;

a drive mechanism for moving said magnetic tape media longitudinally with respect to said magnetic read and/or write head for reading and/or writing on said magnetic tape media;

a servo transducer sensing said magnetic flux servo dual transitions along said longitudinal direction with respect to said magnetic tape media as said drive mechanism moves said magnetic tape longitudinally and providing signals representative of said magnetic flux servo dual transitions;

a data detector responsive to said sensed servo dual transition signals for detecting the widths of said magnetic flux servo dual transitions to identify said different width ones of said non-parallel magnetic flux dual transitions; and a decoder responsive to said detected different width transitions for decoding said address information encoded in said position shifts.

82. The magnetic tape drive of claim 81, wherein one transition of said magnetic flux servo dual transitions is a positive-going transition, and the other transition of said magnetic flux servo dual transitions is a negative-going transition, and said magnetic tape drive additionally comprises:

a servo detector responsive to only one of said positive-going or said negative-going transitions of each of said sensed servo dual transitions for detecting said servo information; and said data detector for detecting different width dual transitions is responsive to both said positive-going and said negative-going transitions of said sensed servo dual transitions.

83. A method for superimposing data information in pairs of non-parallel servo dual transitions on a storage medium, employing two spaced apart write elements having non-parallel gaps, at least one of which is continuously longitudinally variable in a direction transverse to said storage medium, and a drive for moving said storage medium in the longitudinal direction across said write elements at a predetermined velocity, comprising the steps of:

encoding data information into predetermined time delays;

providing timed pulses to said spaced apart write elements to write patterns of pairs of servo dual transitions corresponding to said non-parallel gaps; and adding said time delays to selected said timed pulses in accordance with said encoding to thereby alter the width of at least a one of said servo non-parallel dual transitions to a different width than other of said dual transitions, said different width transitions comprising data information.

84. A method for reading data superimposed in a servo pattern on a moving storage medium, said servo pattern having bursts of pairs of non-parallel sensible servo dual transitions that extend laterally with respect to said moving storage medium, said superimposed data comprising selected pairs of said dual transitions having different widths with respect to others of said dual transitions, comprising the steps of:

sensing said sensible servo dual transitions along said longitudinal direction with respect to said moving storage medium;

detecting, in response to said sensed servo dual transitions, ones of said non-parallel sensible dual transitions having said different widths; and decoding, in response to said detected different dual transition widths, said superimposed data.

85. The method for reading data of claim 84, wherein one transition of said sensible servo dual transitions is a positive-going transition, and the other transition of said sensible servo dual transitions is a negative-going transition, and said method additionally comprises:

a servo detecting step of detecting only one of said positive-going or said negative-going transitions of each of said sensed servo dual transitions for detecting said servo information; and said different widths detecting step comprises detecting both said positive-going and said negative-going transitions of said sensed servo dual transitions.

* * * * *